(12) United States Patent
Ogawa

(10) Patent No.: US 8,098,306 B2
(45) Date of Patent: *Jan. 17, 2012

(54) PHASE ADJUSTMENT DEVICE, PHASE ADJUSTMENT METHOD AND DIGITAL CAMERA

(75) Inventor: Mayu Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 648 days.

This patent is subject to a terminal disclaimer.

(21) Appl. No.: 12/047,558

(22) Filed: Mar. 13, 2008

(65) Prior Publication Data

US 2008/0225141 A1   Sep. 18, 2008

(30) Foreign Application Priority Data

Mar. 14, 2007  (JP) ................. 2007-064959

(51) Int. Cl.
*H04N 9/64*   (2006.01)
(52) U.S. Cl. ............. 348/251; 348/241; 348/222.1
(58) Field of Classification Search .......... 348/251
See application file for complete search history.

(56) References Cited

U.S. PATENT DOCUMENTS

| | | | | |
|---|---|---|---|---|
| 4,644,287 A | * | 2/1987 | Levine | 377/63 |
| 5,202,586 A | * | 4/1993 | Hori et al. | 327/95 |
| 6,160,578 A | * | 12/2000 | Carroll et al. | 348/222.1 |
| 6,426,804 B1 | * | 7/2002 | Kanno et al. | 358/445 |
| 6,493,029 B1 | * | 12/2002 | Denyer et al. | 348/236 |
| 6,963,368 B1 | * | 11/2005 | Shibazaki | 348/241 |
| 2004/0109065 A1 | * | 6/2004 | Tokunaga | 348/207.99 |
| 2004/0233305 A1 | * | 11/2004 | Morishita | 348/245 |
| 2008/0122942 A1 | * | 5/2008 | Mimata et al. | 348/222.1 |
| 2009/0207253 A1 | * | 8/2009 | Ogawa et al. | 348/187 |

FOREIGN PATENT DOCUMENTS

| | | |
|---|---|---|
| JP | 04-130866 | 5/1992 |
| JP | 05-168050 | 7/1993 |
| JP | 2001-054027 | 2/2001 |
| JP | 2002-077740 | 3/2002 |
| JP | 2002-094878 | 3/2002 |
| JP | 2005-151081 | 6/2005 |
| JP | 2006-140926 | 6/2006 |
| WO | WO 2007/119483 | 10/2007 |

OTHER PUBLICATIONS

Japanese Office Action issued in Japanese Patent Application No. JP 2007-064959 dated Oct. 18, 2011.

* cited by examiner

*Primary Examiner* — Sinh Tran
*Assistant Examiner* — Paul Berardesca
(74) *Attorney, Agent, or Firm* — McDermott Will & Emery LLP

(57) ABSTRACT

A brightness level detector detects a brightness level of the digital imaging signal for each of the plurality of pixels. A shading detector sets a group of pixel regions distant from each other in a horizontal direction in the imaging element and then detects whether or not shadings are generated in the analog imaging signal based on a difference between the brightness levels of the group of pixel regions. A timing adjuster adjusts a phase of a peak sample pulse for detecting a peak level of the analog imaging signal, a phase of a reference sample pulse for detecting a signal level used as a reference in the correlated double sampling executed when the digital imaging signal is generated and a phase of a horizontal transfer pulse in the imaging element based on outputs of the brightness level detector and the shading detector.

13 Claims, 24 Drawing Sheets

F I G. 1
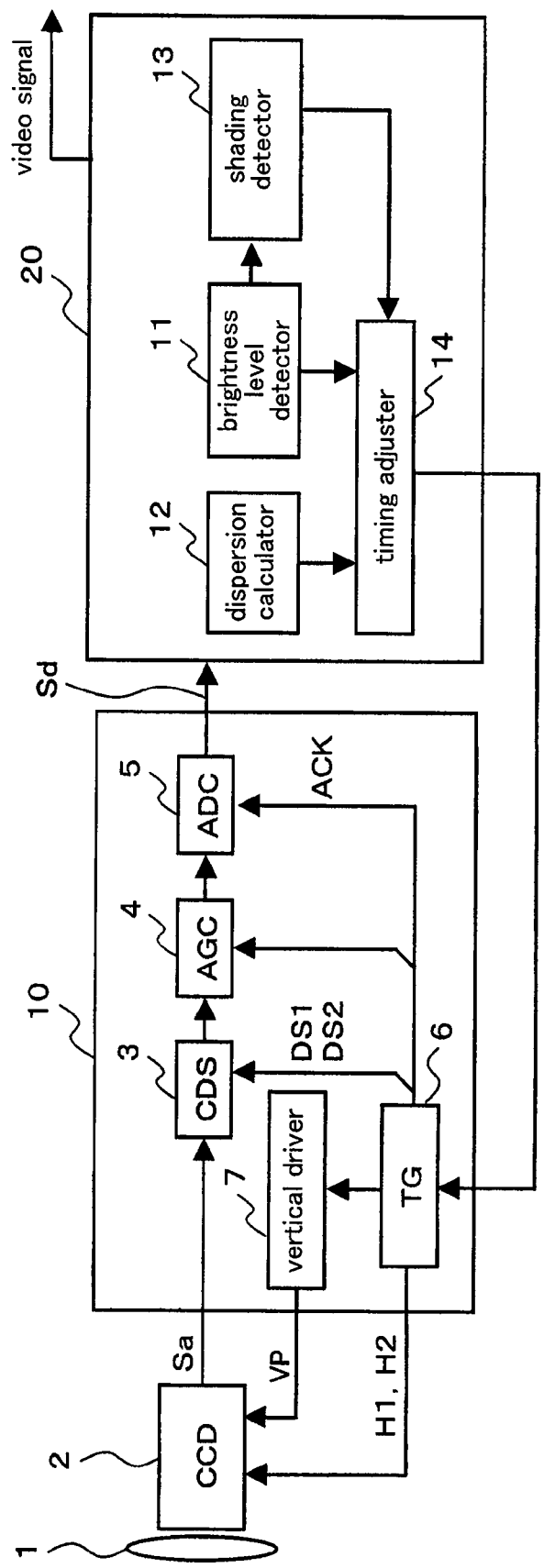

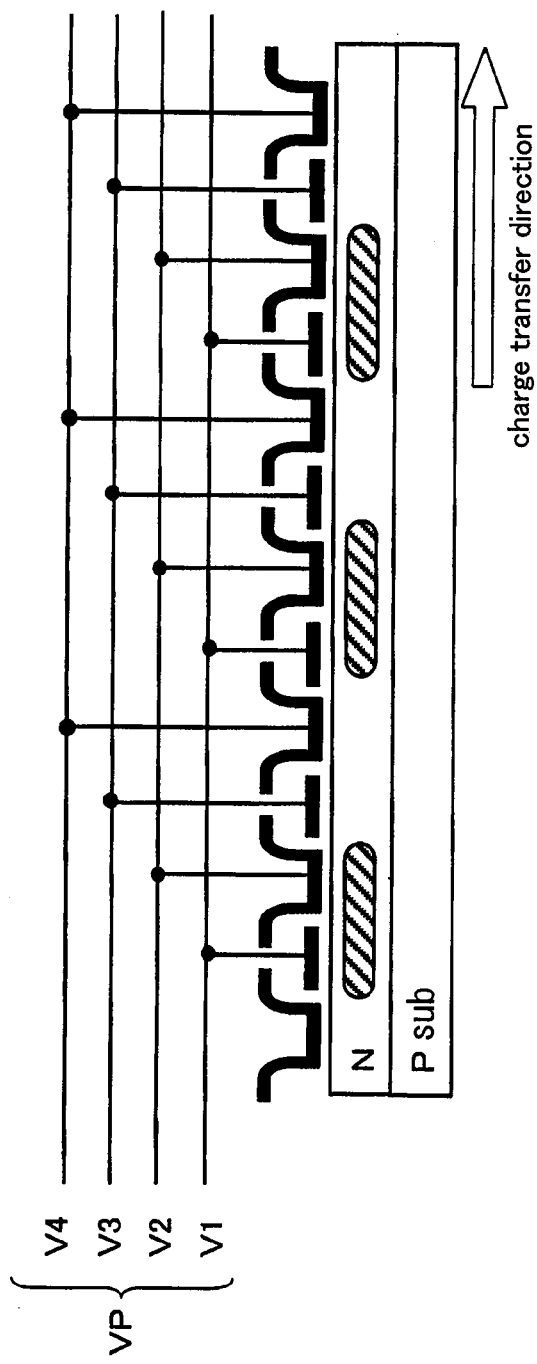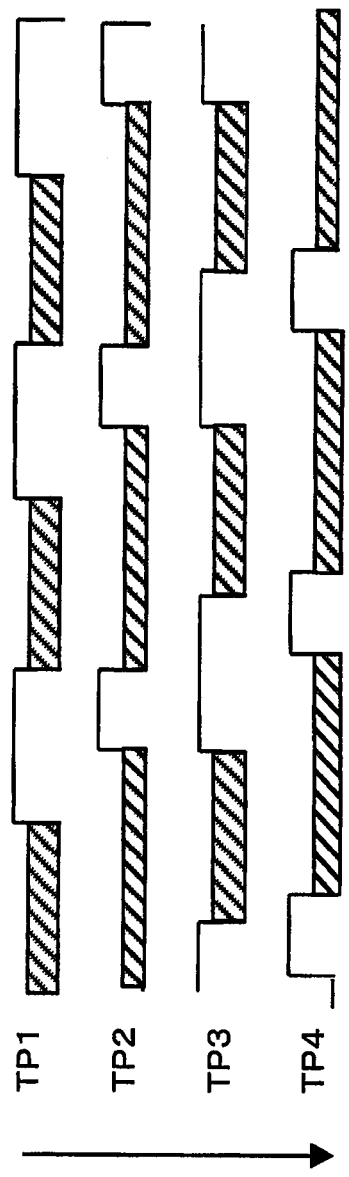
FIG. 4A
FIG. 4B

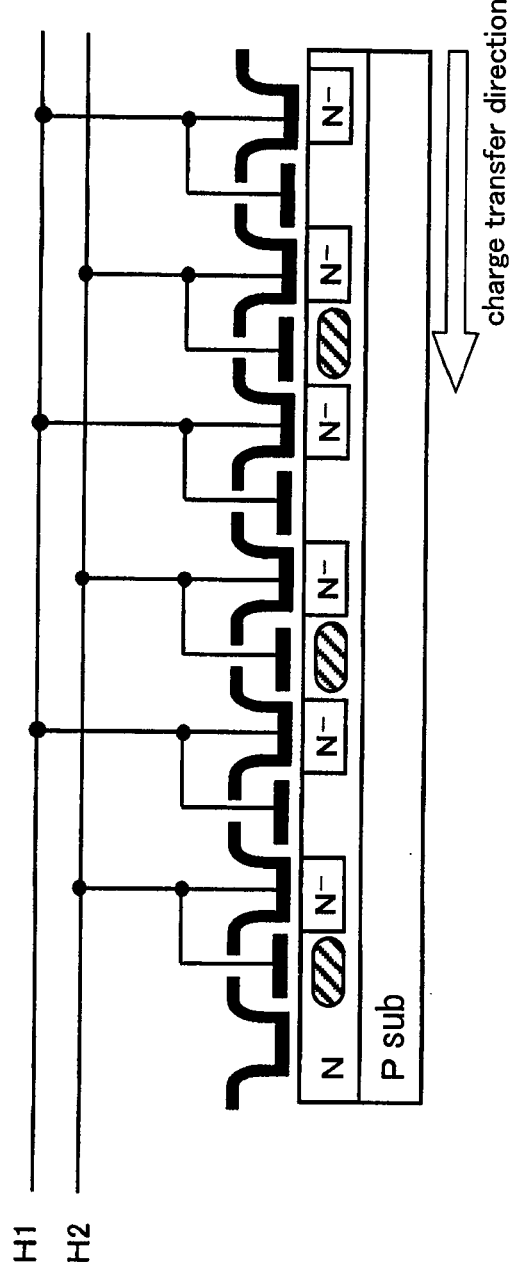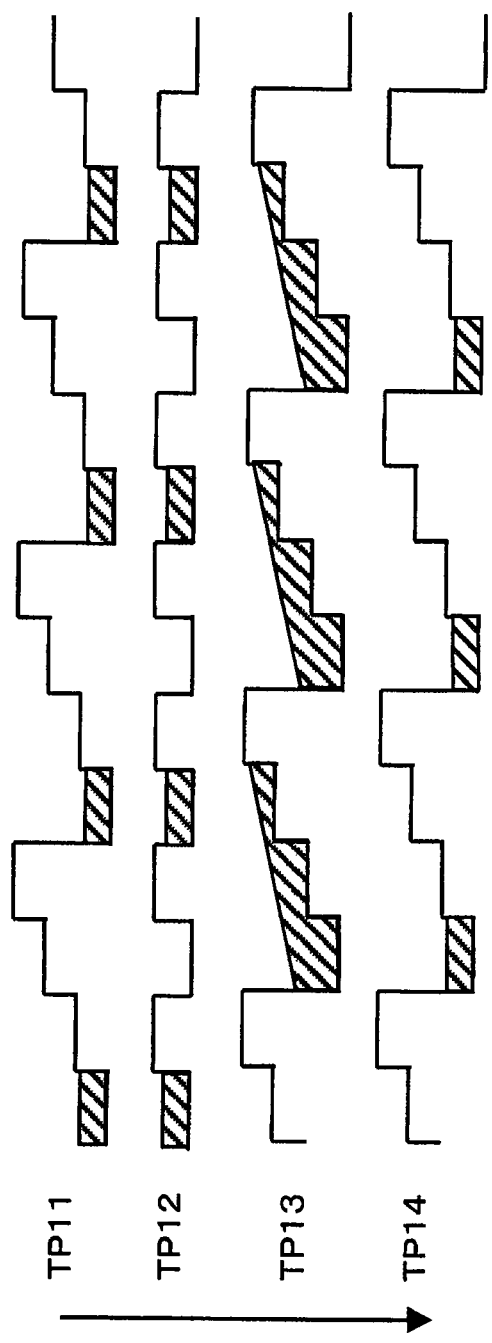
F I G. 5A
F I G. 5B phase optimal value phase optimal value

F I G. 1 4
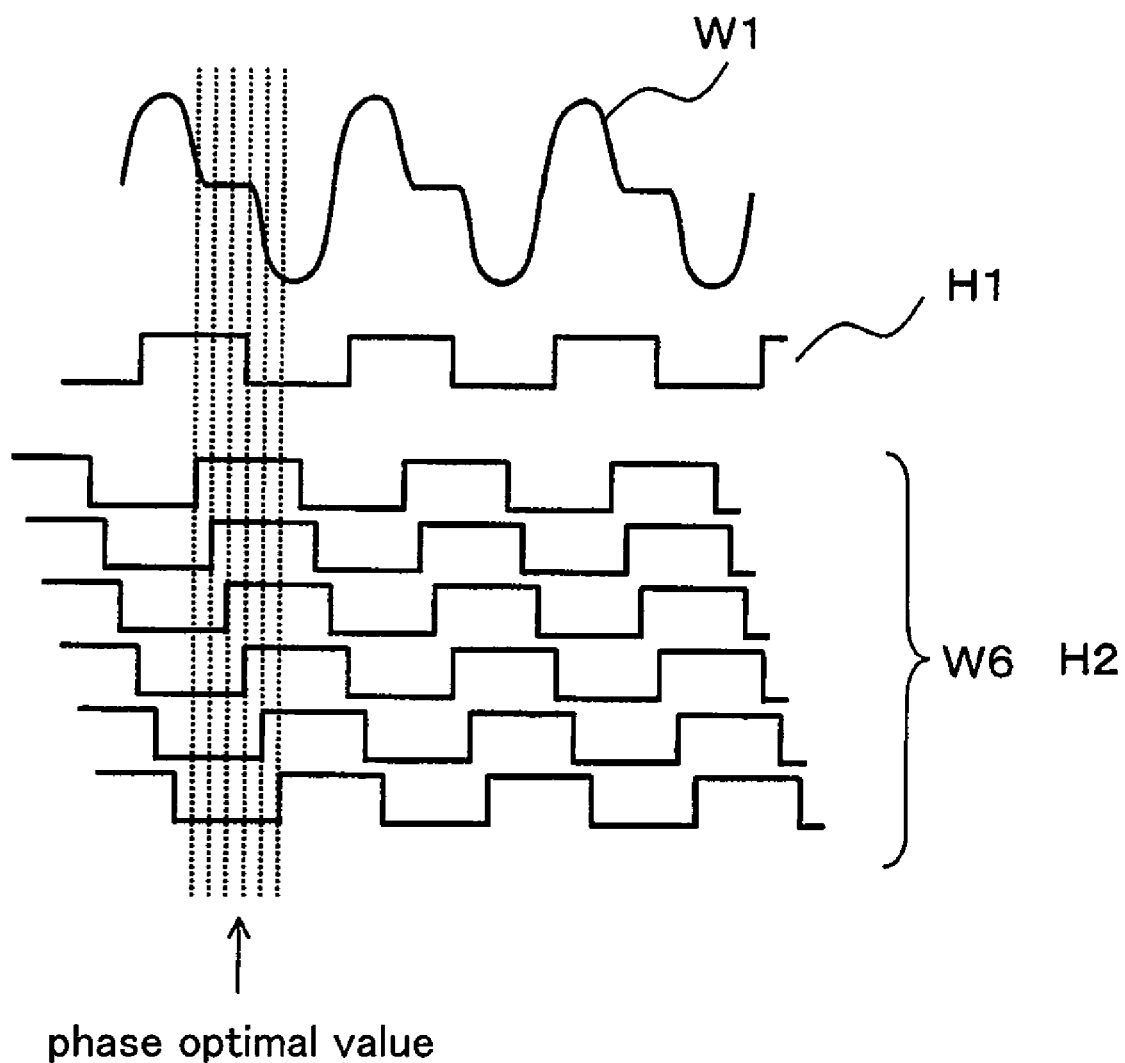
phase optimal value

F I G. 2 4
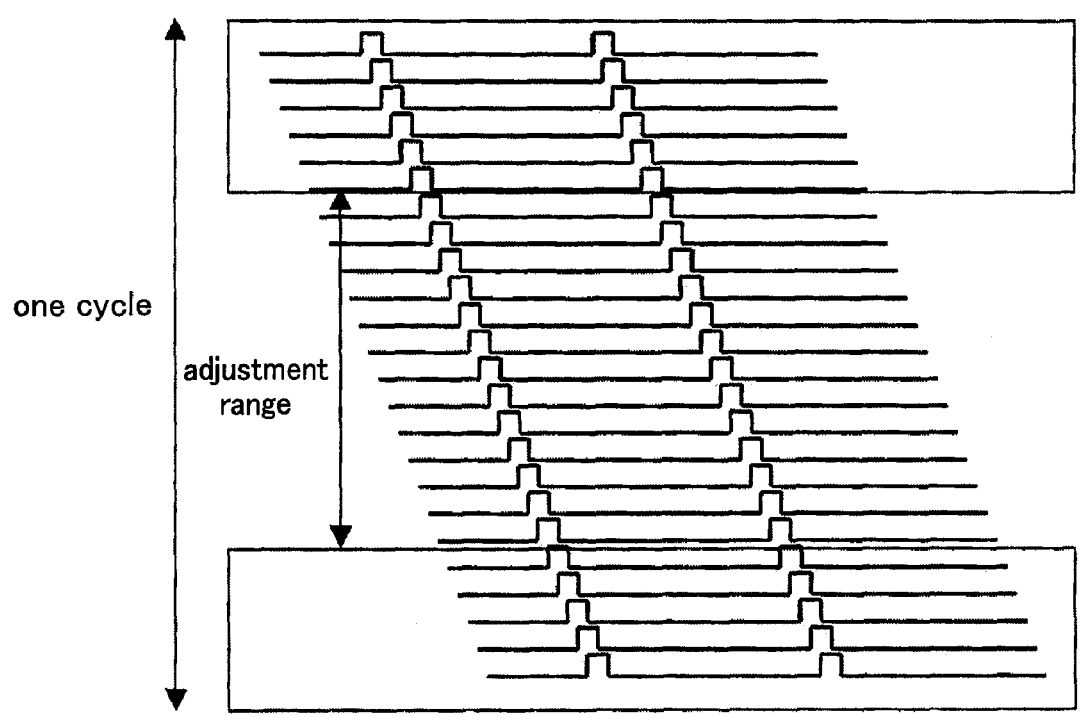

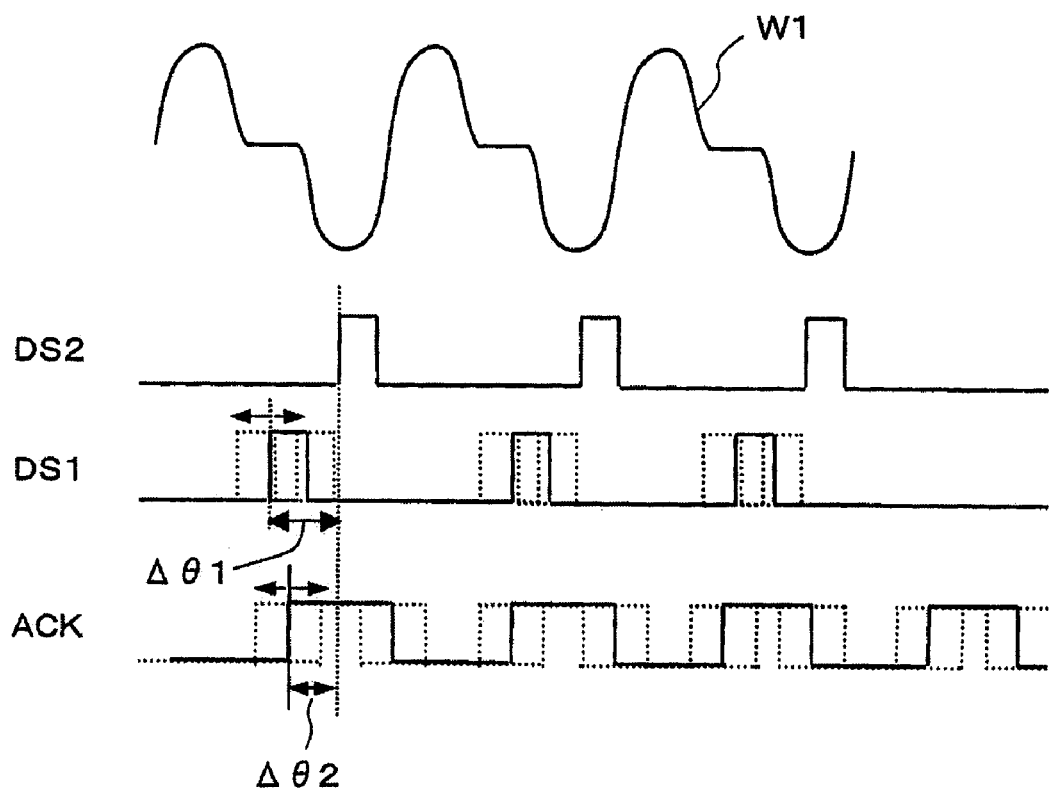

PHASE ADJUSTMENT DEVICE, PHASE ADJUSTMENT METHOD AND DIGITAL CAMERA

BACKGROUND OF THE INVENTION

1. Field of the Invention

The present invention relates to a phase adjustment device and a phase adjustment method for adjusting a phase (timing) of a pulse used when an image is obtained by a digital camera, and a digital camera in which the phase adjustment device is incorporated.

2. Description of the Related Art

In a digital camera, (digital still camera, digital video camera, mobile telephone provided with a camera, and the like), an analog imaging signal obtained by an imaging element such as CCD or a MOS sensor is converted into a digital imaging signal, and then, after being processed in a predetermined manner, the resultant is recorded. In order to obtain an image of a photographic subject using the imaging element, a pulse for detecting a signal level of the analog signal inputted from the imaging element, a pulse for driving the imaging element, and the like, are necessary, and it is difficult to adjust phases of these pulses in the hardware designing stage due to variability generated in the manufacturing process. Therefore, the phases are adjusted by a technician after the manufacturing process, and information showing the adjusted phases is stored in a memory region and read from the memory region when the product is actually used so that the phases are optimally set.

There is a known conventional technology wherein only a noise element is fetched in a minimum exposure time, and the phase is adjusted under such a condition that a high-frequency component (noise element) is minimized. An example of the technology is recited in No. 2005-151081 of the Japanese Patent Applications Laid-Open.

In the field of the digital camera, various changes may be made to a system where a phase adjustment device is incorporated. In the case where the digital camera is adopted as a medical-care camera, it is possible that the imaging element will be exchanged after the digital camera is manufactured. In the case where the system incorporating the phase adjustment device or the imaging element is thus subjected to some change, the phase of the pulse for detecting the signal level of the analog signal inputted from the imaging element also changes, which makes it necessary to readjust the phase. However, it is difficult to speedily and easily change the system incorporating the phase adjustment device or replace the imaging element when the technician has to manually readjust the phase.

Another disadvantage of the invention recited in the foregoing document is that, though there are various types of pulses to be adjusted, optimal phases of all of the pulses are calculated by means of the same method irrespective of characteristics of those pulses, resulting in failure to achieve a high accuracy in phase adjustment.

Further, in the digital camera, the phases of a plurality of horizontal transfer pulses in the imaging element (in particular, CCD) are generally adjusted by the technician in accordance with a mounting status. In the horizontal transfer pulses, the combination of a voltage of the first horizontal transfer pulse and a voltage of the second horizontal transfer pulse are controlled, and the depths of potential wells are thereby controlled so that signal charges are transferred. The control is thus made as a countermeasure against shadings which are generated on right and left sides of a screen due to the deterioration of an efficiency level in the transfer when the phases of the horizontal transfer pulses are inappropriate. The shadings are the unevenness generated on the screen. An amount of the charges decreases in a pixel having a larger number of transfer stages in the horizontal transfer CCD, and the shadings are thereby generated due to the different charge amounts on the right and left sides of the screen. As a result, an image quality is deteriorated.

However, in the conventional manner wherein the technician manually adjusts the phases of the horizontal transfer pulses in a manner similar to the other pulses, it is difficult to change the system incorporating the phase adjustment device and exchange the imaging element in a speedy and easy manner.

SUMMARY OF THE INVENTION

Therefore, a main object of the present invention is to make it possible to speedily and easily perform the phase adjustment of the imaging pulse including the horizontal transfer pulse in comparison to the manual adjustment by a technician even in the case where the system incorporating the phase adjustment device is changed and the imaging element is exchanged, and improve the accuracy of the phase adjustment.

A phase adjustment device according to the present invention is a phase adjustment device for adjusting a phase of a pulse used for imaging an analog imaging signal obtained by an imaging element comprising a plurality of pixels based on a digital imaging signal resulting from the conversion of the analog imaging signal into a digital value for each pixel, comprising:

a brightness level detector for detecting a brightness level of the digital imaging signal for each of the plurality of pixels;

a shading detector for setting a group of pixel regions distant from each other in a horizontal direction in the imaging element and then checking whether or not shadings are generated in the analog imaging signal based on a difference between the brightness levels of the group of pixel regions; and a timing adjuster for adjusting a phase of a peak sample pulse for detecting a peak level of the analog imaging signal, a phase of a reference sample pulse for detecting a signal level used as a reference in the correlated double sampling executed when the digital imaging signal is generated and a phase of a horizontal transfer pulse in the imaging element based on outputs of the brightness level detector and the shading detector.

In the phase adjustment device thus constituted, the brightness level detector detects the brightness level in the digital imaging signal resulting from the plurality of pixels in the pixel region and supplies the obtained brightness information to the timing adjuster. The timing adjuster adjusts the phase of the pulse based on the received brightness information. The phase adjustment of the pulse based on the brightness information is suitable for, for example, the phase adjustment of the peak sample pulse for sampling the signal component which is at its peak in a signal period or the phase adjustment of the reference sample pulse for sampling the signal component used as the reference in the correlated double sampling. Further, the shading detector detects the shadings based on the difference between the brightness levels in the two pixel regions horizontally distant from each other among the brightness levels detected by the brightness level detector, and supplies a result of the shading detection to the timing adjuster. The timing adjuster adjusts the phase of the horizontal transfer pulse so that the degree of the shadings is minimized.

The operation of the phase adjustment so far described is automatically executed by the collaborative operations by the brightness level detector, shading detector and timing adjuster. Further, in the phase adjustment of the pulse implemented in the case where a system into which the phase adjustment device is incorporated is changed or the imaging element is exchanged, the brightness level detector measures the brightness level and the shading detector detects if the shadings are generated or not in the digital imaging signal resulting from the plurality of pixels. As a result, the phase of the pulse is adjusted in the consideration of the brightness level and the shadings. Therefore, the phase adjustment of the imaging pulse can be very accurate. Further, the peak sample pulse, reference sample pulse and horizontal transfer pulse are automatically adjusted, which reduces an amount of time necessary for the phase adjustment in comparison to the case where the technician manually adjusts the phase of the pulse. Because the phase of the horizontal transfer pulse is also automatically adjusted, in particular, any influence from the shadings can be eliminated, and an image with a high quality can be obtained.

The phase adjustment device according to the present invention may preferably further comprise a dispersion calculator for calculating dispersion showing a signal variability between the pixels, wherein the timing adjuster further adjust a phase of an AD clock signal used when the digital imaging signal is generated based on results obtained by the brightness level detector and the dispersion calculator.

According to the phase adjustment device thus constituted, the dispersion calculator calculates the dispersion of the digital imaging signal resulting from the plurality of pixels for which a dispersion showing the signal variability between the pixels should be calculated and supplies the obtained dispersion information to the timing adjuster. The timing adjuster further adjusts the phase of the pulse based on the received dispersion information. The phase adjustment of the pulse based on the dispersion information is suitable for, for example, the phase adjustment of the AD clock signal which is an operation clock when the analog imaging signal is AD-converted into the digital imaging signal.

In the phase adjustment device according to the present invention, the brightness level is preferably an average value of the signal levels of the digital imaging signals in the pixel regions.

A phase adjustment method according to the present invention is a phase adjustment method for adjusting a phase of a peak sample pulse for detecting a peak level of an analog imaging signal outputted from an imaging element, a phase of a reference sample pulse for detecting a signal level which is used as a reference of the correlated double sampling executed when the analog imaging signal is converted into a digital imaging signal, a phase of an AD clock signal used when the analog imaging signal is AD-converted into the digital imaging signal, and a phase of a horizontal transfer pulse in a horizontal transfer unit of the imaging element, including:

a step of detecting the phase of the peak sample pulse in which a brightness level of the analog imaging signal is maximized in a state where the phase of the reference sample pulse and the phase of the AD clock signal are respectively fixed to arbitrary phases;

a step of setting the phase of the peak sample pulse in which the brightness level of the analog imaging signal is maximized to an optimal phase of the peak sample pulse;

a step of detecting a phase of a second horizontal transfer pulse, which is one of first and second horizontal transfer pulses constituting the horizontal transfer pulse, where a horizontal transfer efficiency in the horizontal transfer unit is maximized in a state where a phase of a first horizontal transfer pulse is fixed; and a step of setting the phase of the second horizontal transfer pulse where the horizontal transfer efficiency is maximized to an optimal phase of the second horizontal transfer pulse.

In the phase adjustment method, the brightness level is actually measured and the presence of the shadings is judged in relation to the digital imaging signal obtained via the plurality of pixels in the phase adjustment implemented in the case where the system into which the phase adjustment device is incorporated is changed or the imaging element is exchanged, and the phase of the peak sample pulse and the phase of the second horizontal transfer pulse are adjusted in the consideration of the brightness level and the shadings. Therefore, the phase adjustment of these pulses can be very accurate. Further, the phase of the peak sample pulse and the phase of the second horizontal transfer pulse are automatically adjusted. Therefore, the amount of time necessary for the phase adjustment can be reduced in comparison to the case where the technician manually adjusts the phase of the pulse. In the foregoing method, concerning a correlation between the phases of the first and second horizontal transfer pulses, either phase may be ahead of the other or may lag behind the other.

The phase adjustment method may preferably further include:

a step of detecting a phase region in which the variation of the brightness level is small in the reference sample pulse in a state where the phase of the peak sample pulse is fixed to the optimal phase of the peak sample pulse and the phase of the AD clock signal is fixed to the arbitrary phase; and a step of setting a central phase of the phase region in which the variation of the brightness level is small to an optimal phase of the reference sample pulse.

According to the phase adjustment method thus constituted, the phase of the peak sample pulse is automatically adjusted, and the phase of the reference sample pulse is also automatically adjusted. As a result, the image quality can be further improved.

The phase adjustment method may preferably further include:

a step of detecting the phase of the AD clock signal in which dispersion showing the signal variability between the pixels is minimized in a state where the phase of the peak sample pulse is fixed to the optimal phase of the peak sample pulse, the phase of the reference sample pulse is fixed to the optimal phase, and an incident light of the imaging element is blocked; and a step of setting the phase of the AD clock signal in which the dispersion is minimized to the optimal phase of the AD clock signal.

According to the phase adjustment method thus constituted, the phases of the peak sample pulse and the reference sample pulse are automatically adjusted, and the phase of the AD clock signal is also automatically adjusted. As a result, the image quality can be further improved.

The phase adjustment method is preferably constituted in such a manner that the imaging element is a color filter CCD, and brightness levels of respective colors in at least two pixel regions having an identical vertical coordinate are calculated while the phase of the second horizontal transfer pulse is being changed at the same time, the phase of the second horizontal transfer pulse in which the variation of the calculated brightness levels of the respective colors in the at least two pixel regions is minimized is set to the phase of the second horizontal transfer pulse in which the horizontal transfer efficiency is maximized in the step of detecting the phase in which the horizontal transfer efficiency is maximized.

According to the phase adjustment method thus constituted, the brightness levels of the respective colors in the at least two pixel regions on the same vertical coordinate are calculated, and the phase of the second horizontal transfer pulse in which the variation of the calculated brightness levels of the respective colors in the at least two pixel regions is minimized is set to the phase of the second horizontal transfer pulse in which color shading is minimized in relation to the generation of the color shadings. More specifically, a difference between the brightness average values in the first and second pixel regions is obtained in relation to a color. The difference is obtained in all of the colors, and the sum of the differences between the brightness average values in all of the colors is calculated. Then, such a phase that the sum is minimized is detected.

The phase adjustment method is preferably constituted in such a manner that the imaging element is a color filter CCD, and the phase in which a transfer leak with respect to the horizontally adjacent pixel resulting from the deterioration of the transfer efficiency is minimized is set to the phase in which the horizontal transfer efficiency is maximized in a state where an arbitrary color of the colors which can be received by the color filter CCD is singly imaged in the step of detecting the phase in which the horizontal transfer efficiency is maximized.

In the case where an arbitrary color of the colors which can be received by the color filter is singly imaged (for example, red (R) is singly imaged), an output signal of another color adjacent thereto (color corresponding to the arbitrary color, and green (Gr) with respect to red (R)) is ideally 0 unless the transfer efficiency is deteriorated. Therefore, when the brightness level of that other color alone (for example, green (Gr)) is calculated while the phase of the second horizontal transfer pulse is being shifted at the same time, and the phase in which the obtained value is minimized (phase in which the transfer residue due to the transfer deterioration is minimized) is detected, the optimal phase of the second horizontal transfer pulse is decided.

The phase adjustment method may preferably further include:

a sample pulse adjusting step for adjusting at least one of the phases of the reference sample pulse, the peak sample pulse and the AD clock signal; and a horizontal transfer pulse adjusting step for adjusting at least one of the phases of the first and second horizontal transfer pulses, wherein the sample pulse adjusting step and the horizontal transfer pulse adjusting step are repeatedly executed.

The sample pulse adjusting step is a step in which the correlation with respect to the phase of a predetermined horizontal transfer pulse in a certain mounting status is adjusted. When the phase of the horizontal transfer pulse changes, the optimal phase in the sample pulse adjusting step also changes. Further, in the horizontal transfer pulse adjusting step, it is not possible to accurately sample the signal when the phase in the adjustment of the sample pulse is inappropriate, which undermines the reliability of measured data. In other words, the adjustment result of the sample pulse adjusting step implemented earlier is affected by the horizontal transfer pulse adjusting step implemented after the sample pulse adjusting step. When the two steps, which are the sample pulse adjusting step and the horizontal transfer pulse adjusting step, are repeatedly executed, therefore, any possible error can be gradually reduced, and the accuracy in detecting the optimal phase can be further improved.

The phase adjustment device may preferably further comprise a flicker detector for detecting a flicker generated in an imaging operation under a fluorescent light, wherein the timing adjuster corrects the phase to be adjusted in accordance with a cycle of the flicker which is detected by the flicker detector.

The imaging operation under the fluorescent light may be affected by the flicker resulting from the fluorescent light. A light amount of the fluorescent light relates to a frequency of a power supply voltage. Therefore, in the case where a shutter speed of an imaging system and the frequency of the fluorescent light flicker do not synchronize with each other, the light amount changes depending on different shutter timings, which influences the brightness level and the optimal phase adjustment. Therefore, the flicker detector is provided so that the cycle of the fluorescent light flicker is detected, and the phase to be adjusted is corrected in accordance with the cycle. As a result, the phase adjustment can be optimized.

The phase adjustment device may preferably further comprise a brightness level corrector for calculating a correction coefficient in accordance with the cycle of the flicker which is detected by the flicker detector and correcting the brightness level by multiplying the brightness level calculated by the brightness level detector by the correction coefficient.

The brightness corrector calculates the correction coefficient in accordance with the cycle of the flicker which is detected by the flicker detector, and the brightness level detector or the timing adjuster corrects the brightness level used in the phase adjustment based on the correction coefficient so that the phase adjustment is optimized. Accordingly, the correction can be more accurate in comparison to a constitution wherein an analog gain of an automatic gain controller is adjusted in accordance with the frequency of the flicker or a constitution wherein the shutter speed is changed on a frame-by-frame basis.

The phase adjustment device may preferably further comprise:

a flicker detector for detecting a flicker generated in an imaging operation under a fluorescent light; and an exposure controller for setting the shutter speed of the imaging element to a positive integral multiple of a cycle in which the light amount changes depending on the flicker detection by the flicker detector.

In the foregoing constitution wherein the shutter speed of the imaging element is set to the positive integral multiple of the cycle of the fluorescent light flicker, the light amount can be constant though measured at any timing, which is advantageous for the optimization of the phase adjustment.

A digital camera according to the present invention comprises:

an imaging element;

a correlated double sampling unit for calculating a signal level of an analog imaging signal for each pixel obtained via the imaging element;

an automatic gain controller for adjusting an amplitude of an imaging signal outputted from the correlated double sampling unit;

an AD converter for generating a digital imaging signal by converting the imaging signal whose amplitude is adjusted by the automatic gain controller into a digital value;

the phase adjustment device recited in claim 1 for setting a phase suitable for the pulse used by the imaging element when the analog imaging signal is obtained based on the digital imaging signal; and a timing generator for generating the pulse based on the phase adjusted by the phase adjustment device.

The imaging element, correlated double sampling unit, automatic gain controller, AD converter and timing generator, which are the components of the digital camera according to the present invention, are generally provided in a digital camera. Therefore, they need no particular description. The foregoing constitution is characterized in that the phase adjustment device according to the present invention is provided.

According to the present invention, the phase of the imaging pulse including the horizontal transfer pulse is automatically adjusted even in the case where the system into which the phase adjustment device is incorporated is changed and the imaging element is exchanged. Therefore, the amount of time necessary for the phase adjustment can be reduced in comparison to the case where a technician manually adjusts the phase of the pulse. Further, the brightness level is actually measured, and it is judged whether or not the shadings exist, and then, the phase of the pulse is adjusted in the consideration of the brightness level and the shadings. As a result, the phase adjustment of the imaging pulse can be very accurate.

The present invention, wherein the timing of the pulse used for obtaining the image in the digital camera can be automatically adjusted, is effectively applicable to at least a digital camera.

BRIEF DESCRIPTION OF THE DRAWINGS

These and other objects as well as advantages of the invention will become clear by understanding the following description of preferred embodiments of the invention and will be specified in the claims attached hereto. A number of benefits not recited in this specification will come to the attention of the skilled in the art upon the implementation of the present invention.

FIG. 1 is a block diagram illustrating an entire constitution of a digital camera in which a phase adjustment device according to a preferred embodiment 1 of the present invention is provided.

FIGS. 4A and 4B are illustrations of operating principles of a vertical transfer CCD.

FIGS. 5A and 5B are illustrations of operating principles of a horizontal transfer CCD.

FIG. 14 is a timing chart of a signal component used in the phase adjustment of a horizontal transfer pulse according to the preferred embodiment 1.

FIG. 24 is an illustration of a range where the phase is adjusted according to a modified embodiment 4 of the preferred embodiments.

FIG. 25 shows the prediction of optimal positions of the reference sample pulse and the AD clock signal based on the peak sample pulse according to a modified embodiment 5 of the preferred embodiments.

DETAILED DESCRIPTION OF THE INVENTION

Figure 2:
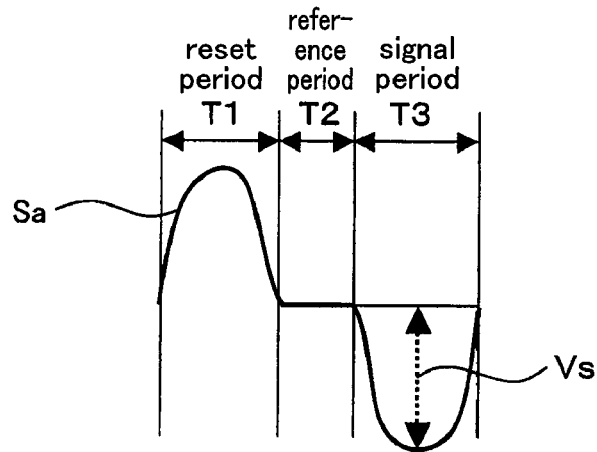
FIG. 2 shows a signal component outputted from CCD in a chronological order.

Hereinafter, a digital camera provided with a phase adjustment device according to each of preferred embodiments of the present invention is described in detail referring to the drawings.

Preferred Embodiment 1

FIG. 1 is a block diagram illustrating an entire constitution of a digital camera according to a preferred embodiment 1 of the present invention. The digital camera according to the present preferred embodiment comprises an optical lens 1 for converging an image of a photographic subject on an imaging element 2, the imaging element 2 for obtaining the image of the photographic subject converged thereon by the optical lens 1 (description is given below referring to CCD as an example of the imaging element 2), an analog front end 10 for executing predetermined processing to an analog imaging signal Sa outputted from the imaging element 2 and converting the resulting signal into a digital imaging signal Sd, and a DSP (Digital Signal Processor) 20 for generating a video signal by executing predetermined processing (color correction, YC processing and the like) to the digital imaging signal Sd outputted from the analog front end 10. The imaging element 2 includes a plurality of pixels, and the plurality of pixels comprise an effective pixel region used for obtaining the image of the photographic subject, and an OB pixel region provided in a periphery of the effective pixel region in a light-blocking manner and used for the detection of the OB (Optical Black) level.

The analog front end 10 comprises a correlated double sampling unit 3 for executing the CDS (Correlated double sampling) in order to determine a signal level of the analog imaging signal Sa outputted from the imaging element 2, an AGC (Automatic Gain Controller) 4 for amplifying the signal outputted from correlated double sampling unit 3 using an adjustable gain, an AD converter (Analog Digital Converter) 5 for converting the signal amplified by the automatic gain controller 4 into the digital imaging signal Sd, a timing generator 6 for generating a pulse used when the image is obtained, and a vertical driver 7 for outputting the pulse generated by the timing generator 6 to the imaging element 2.

The DSP 20 comprises a brightness level detector 11 for detecting a brightness level by calculating an average value of the brightness levels of signals of pixels selected in a predetermined region, a dispersion calculator 12 for calculating a signal level dispersion between the selected pixels, a shading detector 13 for detecting shadings based on a difference between the brightness levels in two pixel regions distant from each other in a horizontal direction among all of the brightness levels detected by the brightness level detector 11, and a timing adjuster 14. The timing adjuster 14 adjusts the phases (timings) of a reference sample pulse DS1, a peak sample pulse DS2, an AD clock signal ACK, and horizontal transfer pulses H1 and H2 in a CCD2 all generated by the timing generator 6. The phase adjustment is implemented based on detection and calculation results of the brightness level detector 11, dispersion calculator 12 and shading detector 13.

FIG. 2 is a drawing which chronologically shows a signal component outputted from the imaging element 2. As shown in FIG. 2, the analog imaging signal Sa includes a reset period T1, a reference period T2 and a signal period T3. The reset period T1 is a period during which the imaging element 2 is reset. The reference period T2 is a period during which a reference voltage is outputted from the imaging element 2, and a signal, which is a reference in the operation of the correlated double sampling unit 3, is detected during this period. The signal period T3 is a period during which a signal voltage is outputted. When the signal voltage which shows a peak in the signal period T3 and the reference voltage in the reference period T2 are subjected to the sampling so that a difference therebetween is obtained, a signal level Vs of the analog imaging signal Sa is obtained. In FIG. 2, a downward direction in the drawing is defined as the signal component in the positive direction.

Figure 3:
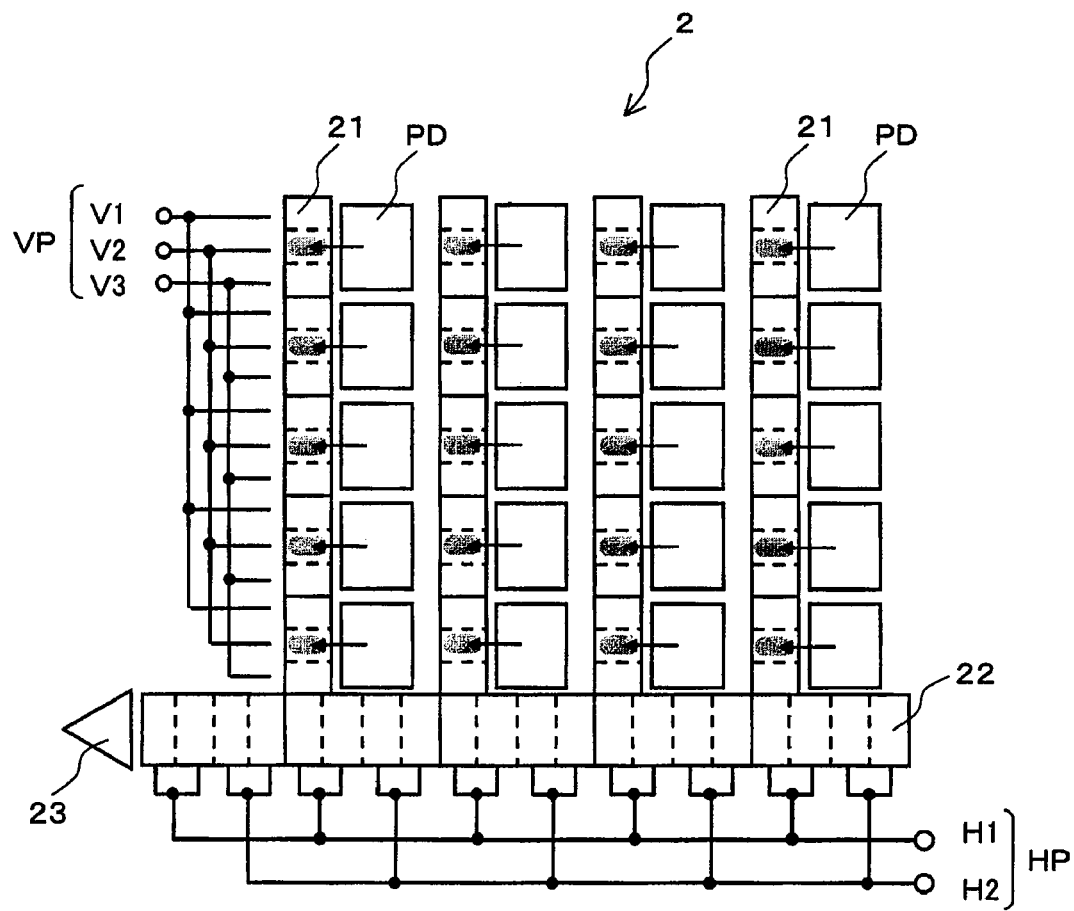
FIG. 3 shows an internal constitution of the CCD.

FIG. 3 shows an internal constitution of the imaging element 2. In FIG. 3, a vertical transfer pulse VP (V2) generated as a reading pulse by the timing generator 6 is applied to gates of the imaging element 2. Accordingly, signal charges stored in photo diodes PD connected to the respective gates are read from the photo diodes PD onto vertical transfer CCDs 21. The signal charges read onto the vertical transfer CCDs 21 are transferred to horizontal transfer CCDs 22 since the vertical transfer pulse VP is applied to the vertical transfer CCDs 21. The signal charges transferred to the horizontal transfer CCDs 22 are transferred on a pixel-by-pixel basis in the direction of a floating diffusion amplifier (FDA) 23 by the horizontal transfer pulses H1 and H2, and the charges are converted into voltages therein.

FIGS. 4A and 4B show operating principles of a four-phase vertical transfer CCD. The transfer of the charges is an operation wherein the charges move in potential wells where they are stored, and the charges are transferred when vertical transfer pulses VP (V1-V4) are sequentially applied in accordance with a charge transfer direction. Below is given a description.

State in the Case of Transfer Potential TP1

In this state, the vertical transfer pulses VP (V1 and V2) are applied. Then, the potential wells are generated only below the gates to which the vertical transfer pulses VP (V1 and V2) are applied, and the signal charges aggregate therein.

State in the Case of Transfer Potential TP2

In this state, the vertical transfer pulses VP (V1, V2 and V3) are applied. Then, the potential wells below the vertical transfer pulses VP (V1 and V2) are maintained, while the potential wells extend further below the vertical transfer pulse VP (V3). As a result, the movement of the signal charges occurs.

State in the Case of Transfer Potential TP3

In this state, the application of the vertical transfer pulses VP (V2 and V3) is maintained, while the application of the vertical transfer pulse V1 is halted. Accordingly, the potential wells are maintained below the vertical transfer pulses VP (V2 and V3); however, the potential well below the vertical transfer pulse VP (V1) disappear. As a result, the signal charges are pushed forward in the transfer direction.

State in the Case of Transfer Potential TP4

In this state, the application of the vertical transfer pulses VP (V2 and V3) is maintained, while the vertical transfer pulse V4 is applied. Then, the potential wells below the vertical transfer pulses VP (V2 and V3) are maintained, while the signal charges extend further below the vertical transfer pulse VP (V4). As a result, the movement of the signal charges occurs. The foregoing operations are thereafter repeated so that the changes are transferred.

FIGS. 5A and 5B show operating principles of a two-phase horizontal transfer CCD. This CCD is different to the CCD shown in FIG. 4 in that:

two electrodes adjacent to each other are electrically connected; and an impurity concentration in the vicinity of an Si substrate surface is set so that, of the two adjacent electrodes, a potential of the electrode on the front side in the transfer direction is always higher than that of the electrode on the rear side.

Below is described the charge transfer operation in the two-phase horizontal transfer CCD.

State in the Case of Transfer Potential TP11

In this state, a first horizontal transfer pulse H1 is applied. Then, a potential on the front side in the transfer direction is at the highest level (higher than the potential on the rear side) below the gate to which the first horizontal transfer pulse H1 is applied. Therefore, the charges stay on the front side in the transfer direction below the gate to which the first horizontal transfer pulse H1 is applied.

State in the Case of Transfer Potential TP12

In this state, the potential of the first horizontal transfer pulse H1 is reduced, while a potential of a second horizontal transfer pulse H2 is increased. Then, the potential wells become shallower.

State in the Case of Transfer Potential TP13

In this state, the reduction of the potential in the first horizontal transfer pulse H1 and the increase of the potential in the second horizontal transfer pulse H2 become more remarkable than those in the case of the transfer potential TP12. Then, the potential below the gate to which the second horizontal transfer pulse H2 is applied becomes higher than the potential below the gate to which the first horizontal transfer pulse H1 is applied. Further, the potential on the front side in the transfer direction is at the highest level (higher than the potential on the rear side) below the gate to which the second horizontal transfer pulse H2 is applied. Therefore, the charges are retained on the front side in the transfer direction below the gate to which the first horizontal transfer pulse H1 is applied and also stay in an entire area below the gate to which the second horizontal transfer pulse H2 is applied. Referring to the potentials of the first horizontal transfer pulse H1 and the second horizontal transfer pulse H2, the potential on the front side in the transfer direction is higher than the potential on the rear side. Therefore, the charges move according to such a potential distribution that the front side is lower than the rear side stepwise.

State in the Case of Transfer Potential TP14

In this state, the application of the first horizontal transfer pulse H1 is halted, while only the second horizontal transfer pulse H2 is applied. Therefore, the movement of the charges is completed, and the potential wells move to below the gate to which the second horizontal transfer pulse H2 is applied.

When the phases of the first and second horizontal transfer pulses H1 and H2 supplied from the timing generator 6 are inappropriate, shadings (unevenness generated on a screen) are generated on the right and left sides of the screen due to the deterioration of a transfer efficiency. The transfer efficiency is a percentage calculated from the ratio between a signal charge amount Q1 stored in a transfer stage and a signal charge amount Q2 in the subsequent transfer stage to which the charge amount Q1 is transferred by the charge transfer operation, and is obtained by the following formula.

$$\text{transfer efficiency} = Q2/Q1 \times 100$$

When the transfer efficiency is, for example, 90%, the transfer of 10% of the charges fails at each transfer stage. Because the charge amount decreases by the power of the transfer stages, the charge amount decreases in a pixel having a larger number of transfer stages, which results in the generation of the shadings on the right and left sides of the screen. If the shadings resulting from the deterioration of the transfer of the first and second horizontal transfer pulses H1 and H2 are detected, the phase can be adjusted. Below is described a more specific method of the detection.

Figure 6:
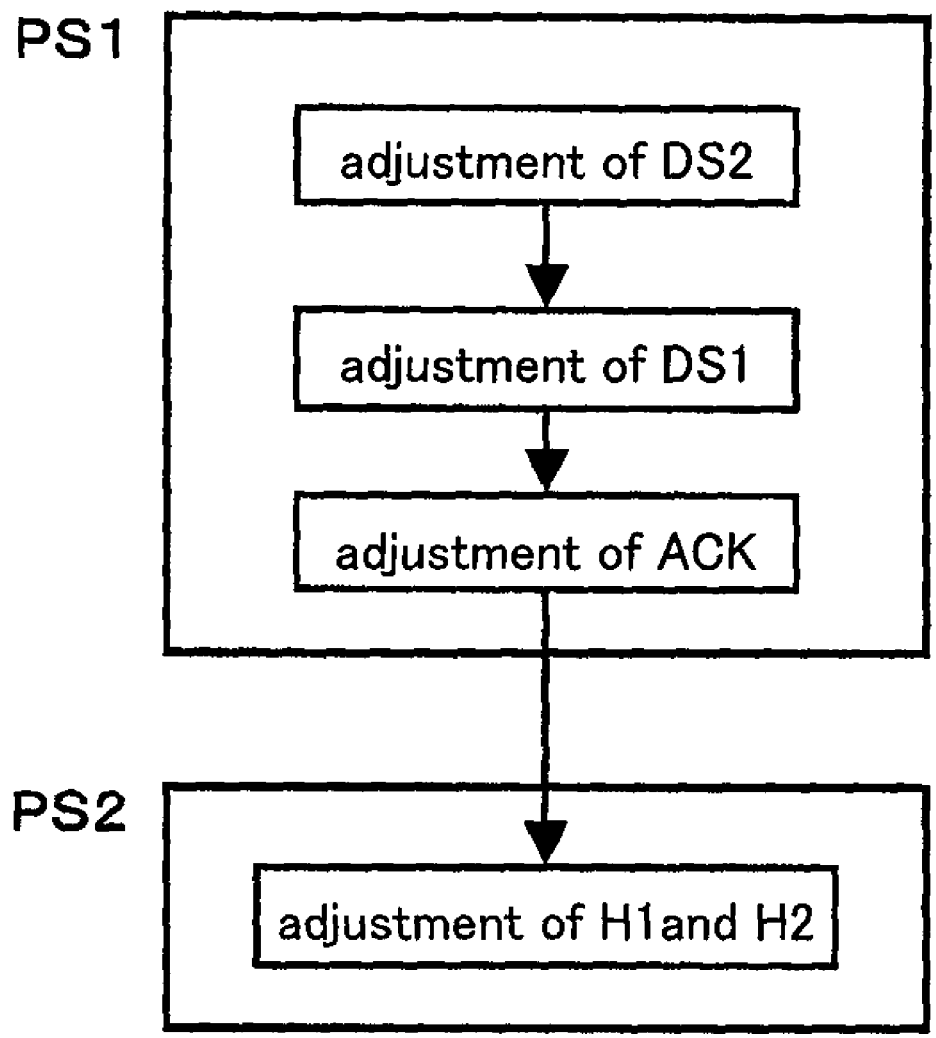
FIG. 6 is a flow chart illustrating overall operations of a phase adjustment method according to the preferred embodiment 1.

FIG. 6 is a flow chart illustrating overall operations of a phase adjustment method according to the preferred embodiment 1. The phase adjustment is implemented mainly by the brightness level detector 11, dispersion calculator 12, shading detector 13 and timing adjuster 14.

It is assumed that the pulses to be adjusted in the present preferred embodiment are the reference sample pulse DS1, peak sample pulse DS2, AD clock signal ACK, and first and second horizontal transfer pulses H1 and H2. The reference sample pulse DS1 is a pulse for sampling the signal component used as a reference in the correlated double sampling. Therefore, it is desirable to adjust the phase so that the rising edge arrives at the center of the reference period T2. The peak sample pulse DS2 is a pulse for sampling the signal component which shows a peak in the signal period T2. Therefore, it is desirable to adjust the phase so that the rising edge arrives when the signal component outputted from the imaging element 2 shows its peak.

The signal level Vs calculated by the correlated double sampling unit 3 is a very difference generated between the signal component at the peak in the rise of the peak sample pulse DS2 and the signal component in the reference period T2 determined by the rise of the reference sample pulse DS1.

The AD clock signal is a clock signal for the operation of the AD converter 5, and a pulse for determining the output timing of the signal outputted from the AD converter 5. Therefore, when the phase of the AD clock signal is inappropriate, such problems as the kickback with respect to the analog and data mislatch are generated, which causes the variability in the AD detection result. Therefore, it is desirable to adjust the phase of the AD clock signal ACK so that the variability is not generated in the AD detection result. The horizontal transfer pulses H1 and H2 have already been described.

The phase adjustment method according to the present preferred embodiment includes a sample pulse adjustment PS1 for adjusting the phases of the peak sample pulse DS2, reference sample pulse DS1 and AD clock signal ACK, and a horizontal transfer pulse adjustment PS2 for adjusting the phases of the first and second horizontal transfer pulses H1 and H2. Below is described the respective adjustments in detail.

Figure 7:
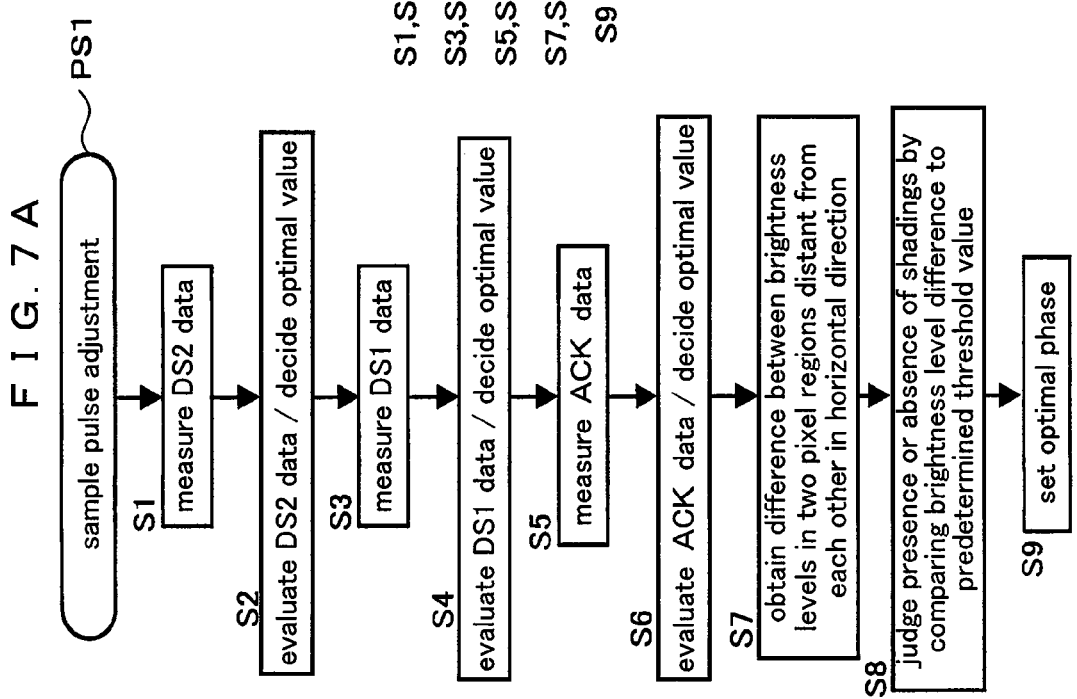
FIG. 7A is a flow chart illustrating more detailed processing of the sample pulse adjustment shown in FIG. 6.
FIG. 7B shows the transition of phases of respective pulses in the sample pulse adjustment shown in FIG. 6.

FIGS. 7A and 7B are flowcharts illustrating more detailed operations of the sample pulse adjustment PS1 shown in FIG. 6. First, the phases of the reference sample pulse DS1 and the AD clock signal ACK are fixed to predetermined initial values, and data necessary for deciding the phase of the peak sample pulse DS2 is measured in such a manner that the phase of the peak sample pulse DS2 is gradually shifted from its initial value (Step S1). Next, the data measured in the Step S1 is evaluated so that an optimal phase of the peak sample pulse DS2 is decided (Step S2). When the phase of the peak sample pulse DS2 is decided, the phase of the peak sample pulse DS2 is fixed to the decided optimal value, and data necessary for deciding the phase of the reference sample pulse DS1 is measured in such a manner that the phase of the reference sample pulse DS1 is gradually shifted from its initial value, with the phase of the AD clock signal ACK being fixed to its initial value (Step S3). Next, the data measured in the Step S3 is evaluated so that an optimal phase of the reference sample pulse DS1 is decided (Step S4). When the phases of the reference sample pulse DS1 and the peak sample pulse DS2 are decided, data necessary for deciding the phase of the AD clock signal ACK is measured in such a manner that the phase of the AD clock signal ACK is gradually shifted from its initial value, with the phases of the reference sample pulse DS1 and the peak sample pulse DS2 being fixed to the optimal values (Step S5). Next, the data measured in the Step S5 is evaluated so that an optimal phase of the AD clock signal ACK is decided (Step S6). Next, of the brightness levels detected by the brightness level detector 11, a difference between the brightness levels in two pixel regions distant from each other in the horizontal direction is calculated (Step S7). Further, when the difference between the brightness levels calculated in the Step S7 is compared to a predetermined threshold value, it is judged where or not the shadings are generated (Step S8). When the optimal phases of the reference sample pulse DS1, peak sample pulse DS2, AD clock signal ACK, and horizontal transfer pulses H1 and H2 are decided, information relating to the decided optimal phases is set in a register in the timing generator 6 (Step S9). Accordingly, the pulses having the optimal phases are generated. FIG. 7B shows the transition of the phases of the respective pulses in the adjustment process.

Next, the phase adjustments of the peak sample pulse DS2, reference sample pulse DS1, AD clock signal ACK and horizontal transfer pulses H1 and H2 are described in detail below.

Phase Adjustment of the Peak Sample Pulse DS2

Figure 8:
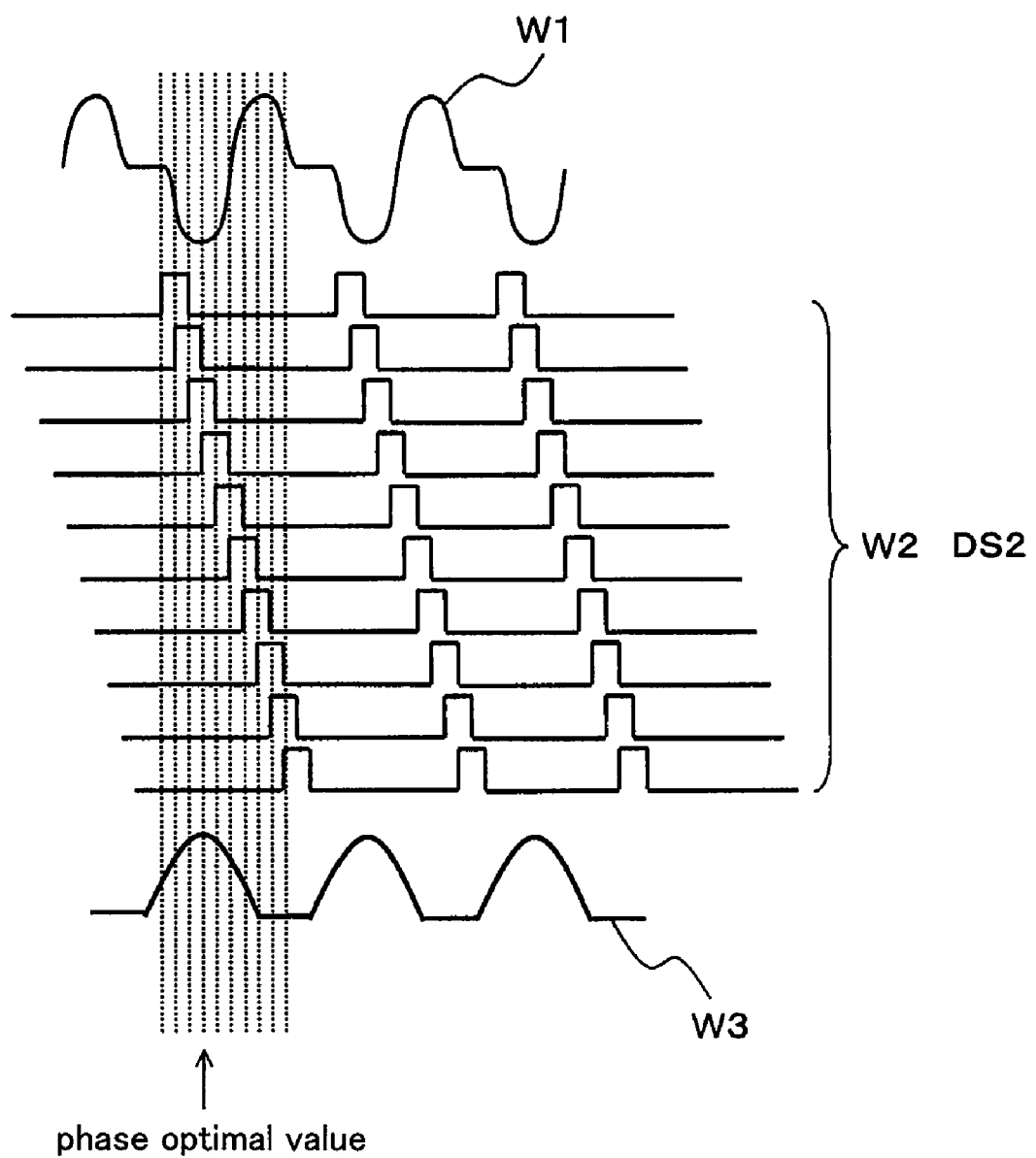
FIG. 8 is a timing chart of a signal component used in the phase adjustment of a peak sample pulse according to the preferred embodiment 1.
Figure 9:
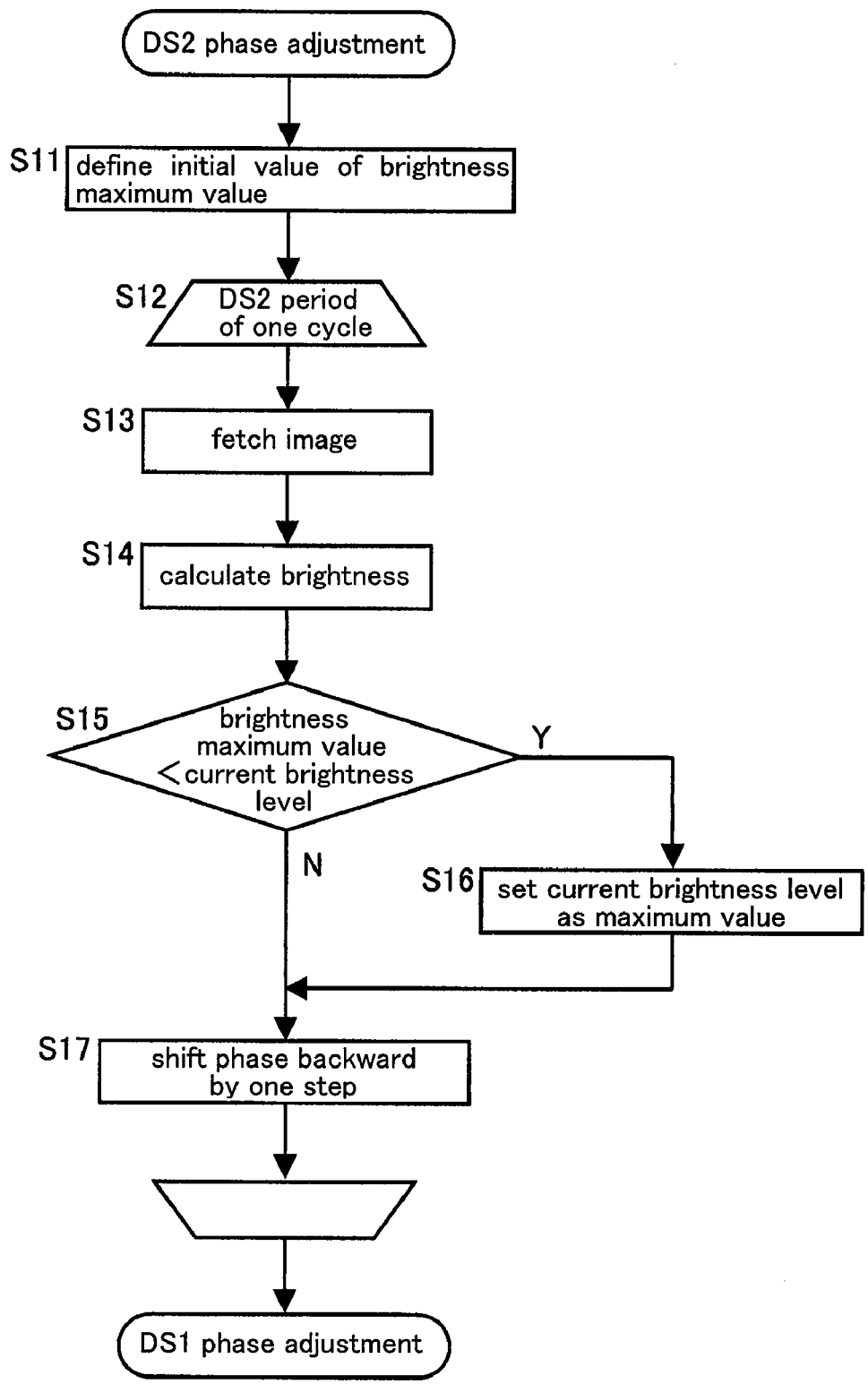
FIG. 9 is a flow chart illustrating detailed operations of the phase adjustment of the peak sample pulse according to the preferred embodiment 1.

First, the phase adjustment of the peak sample pulse DS2 is described referring to FIGS. 8 and 9. FIG. 8 is a timing chart of the signal component used for the phase adjustment of the peak sample pulse DS2. FIG. 9 is a flow chart showing details of the phase adjustment of the peak sample pulse DS2. These drawings correspond to the Steps S1 and S2 shown in FIG. 7.

In FIG. 8, W1 denotes an imaging element output signal (analog input signal Sa), and W3 denotes a brightness signal. The brightness level in the phase adjustment of the peak sample pulse DS2 is defined as an average value of the brightness levels in the signals of the respective pixels selected in a part or all of the effective pixel region of the imaging element 2 (hereinafter referred to as a peak sample pulse detecting region). When the imaging element output signal W1 is in the state shown in FIG. 8, with the phases of the reference sample pulse DS1 and the AD clock signal ACK being fixed, the phase of the peak sample pulse DS2 is shifted as shown in W2; consequently protruding shapes are generated in the brightness signal W3, which generates peaks in its signal level. Based on that, the phase of the peak sample pulse DS2 at the time when the brightness signal W3 is at the maximum level (peak state) is decided as its optimum phase. As described earlier, the signal level Vs of each pixel selected in the image data is the difference between the peak value of the signal component decided by the peak sample pulse DS2 and the signal component as the reference decided by the reference sample pulse DS1. Therefore, the difference should show a negative value in portions where the signal component in the peak sample pulse DS2 and the signal component in the reference sample pulse DS1 have a reverse relation in magnitude; however, the signal level is expressed in zero in the drawing because any negative value is not included in the definition of the signal level in this example.

Referring to FIG. 9 is given a further detailed description. In Step S11, an initial value of the maximum value of the brightness level is defined. As the initial value of the maximum value of the brightness level is set such a small value that is immediately updated in the presence of the signal component having at least a certain level of magnitude. In Step S12, the phases of the reference sample pulse DS1 and the AD clock signal ACK are set to the initial values, and a point which is chronologically slightly later than the initial value of the phase of the reference sample pulse DS1 is set as the initial value of the peak sample pulse DS2. In Step S13, the image data obtained by the imaging element 2 is fetched.

In Step S14, the brightness level in the peak sample pulse detecting region of the fetched image data is detected, in other words, the average value of the brightness levels in the signals of the respective pixels in the peak sample pulse detecting region is calculated. Since it is assumed that any pixel having the signal level showing at least a predetermined value is saturated, such a pixel is desirably excluded in the sampling process. The processing of the Step S14 is executed in the brightness level detector 14.

In Step S5, the current maximum value of the brightness level and the brightness level calculated in the Step S14 are compared to each other. When the brightness level calculated in the Step S14 is larger as a result of the comparison, the brightness level calculated in the Step S14 is set as the current maximum value in Step S16. When the current maximum value of the brightness level is larger in the Step S15, the maximum value of the brightness level is not updated. The Steps S15 and S16 are executed by the timing adjuster 16.

In Step S17, the timing adjuster 16 transmits such an instruction to the timing generator 6 that the phase of the peak sample pulse DS2 is shifted backward by one step with the phases of the reference sample pulse DS1 and the AD clock signal ACK being fixed. After the phase is shifted by one step in the Step S17, the process returns to Step S13 and the Steps S13-S17 are implemented again so that the maximum value of the brightness level is compared.

The operation described so far is repeated in the period of one cycle so that the phase where the brightness level is maximized is decided as the optimum phase of the peak sample pulse DS2.

Phase Adjustment of the Reference Sample Pulse DS1

Figure 10:
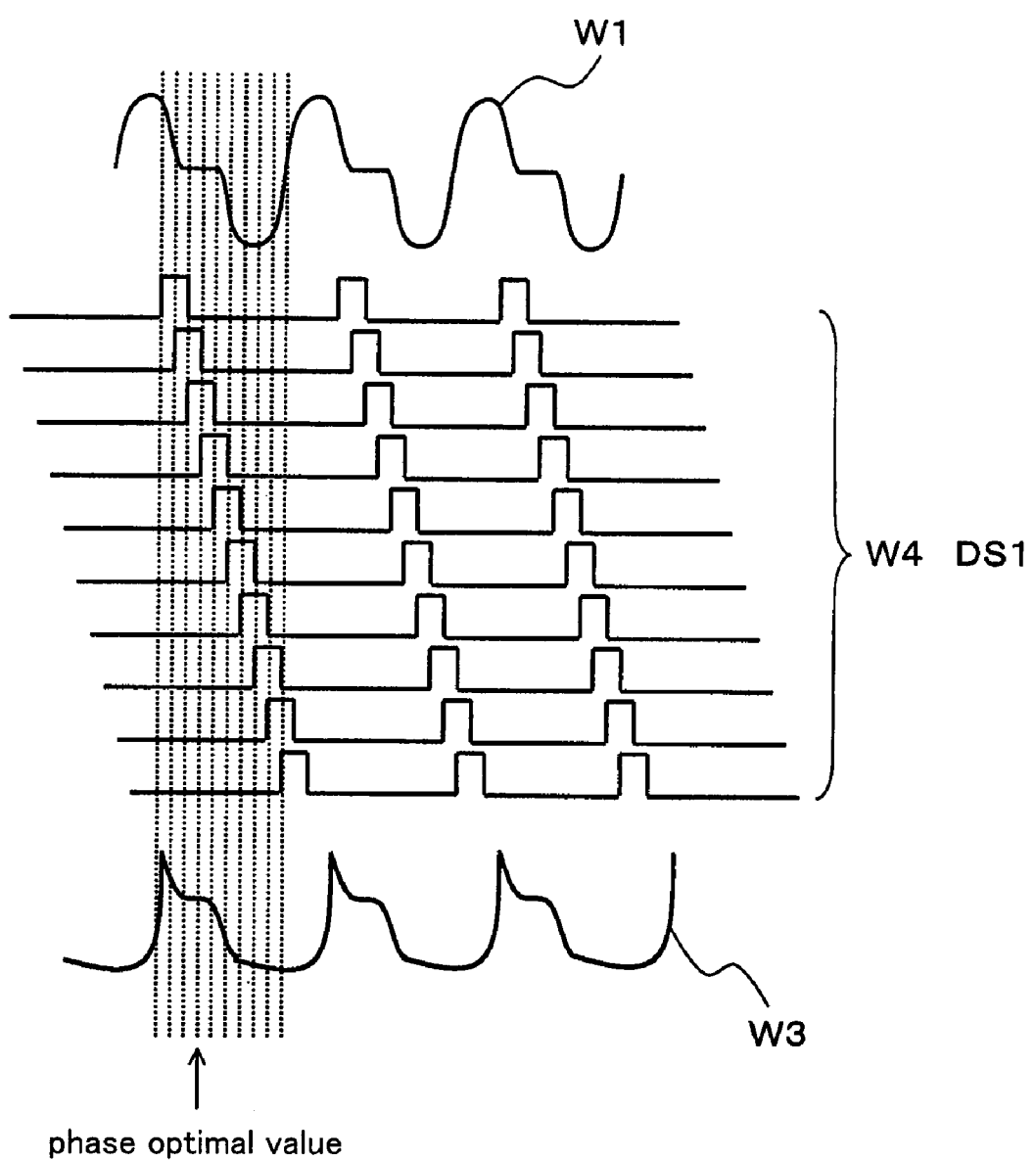
FIG. 10 is a timing chart of a signal component used in the phase adjustment of a reference sample pulse according to the preferred embodiment 1.
Figure 11:
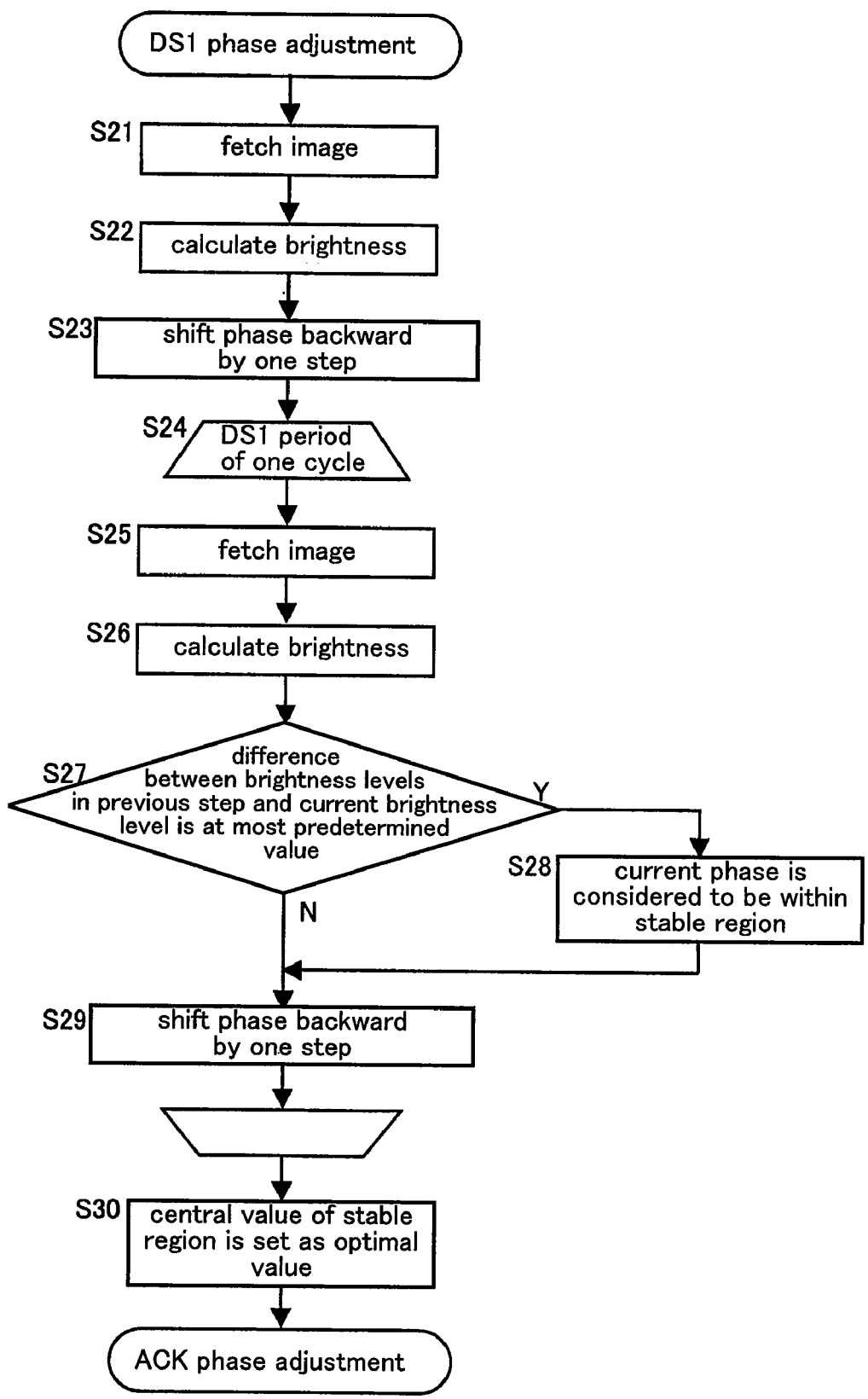
FIG. 11 is a flow chart illustrating detailed operations of the phase adjustment of the reference sample pulse according to the preferred embodiment 1.

Next, the phase adjustment of the reference sample pulse DS1 is described referring to FIGS. 10 and 11. FIG. 10 is a timing chart of the signal component used for the phase adjustment of the reference sample pulse DS1. FIG. 11 is a flow chart showing details of the phase adjustment of the reference sample pulse DS1. These steps correspond to the Steps S3 and S4 shown in FIG. 7.

In FIG. 10, W1 denotes an imaging element output signal, and W3 denotes a brightness signal. In the case of the phase adjustment of the reference sample pulse DS1, the brightness level is defined as an average value of the brightness levels in the signals of the respective pixels selected in a part or all of the effective pixel region of the imaging element 2 (referred to as a reference sample pulse detecting region). When the imaging element output signal is in the state shown in FIG. 10, with the phases of the peak sample pulse DS2 and the AD clock signal ACK being fixed, the phase of the reference sample pulse DS1 is shifted from its initial value as shown in W4, the brightness signal W3 is drastically reduced, substantially constant in the reference period T2, and then reduced again and becomes zero at a point where it matches the peak sample pulse DS2. Based on that, the optimum value of the phase of the reference sample pulse DS1 is decided so that the rising edge arrives at the center of the interval (referred to as stable region) where the brightness signal W3 is substantially constant.

Referring to FIG. 11 is given a further detailed description. In Step S21, the phase of the reference sample pulse DS1 and the phase of the AD clock signal ACK are initialized, and the phase of the peak sample pulse DS2 is set to the optimum value decided by the described adjustment method. Then, the image data obtained by the imaging element 2 (analog video signal) is fetched.

In Step S22, the brightness level in the reference sample pulse detecting region of the fetched image data is detected, in other words, an average value of the brightness levels in the signals of the respective pixels in the reference sample pulse detecting region is calculated. Since it is assumed that any pixel having the signal level showing at least a predetermined value is saturated, such a pixel is desirably excluded in the sampling process. The processing of the Step S22 is executed in the brightness level detector 14.

In Step S23, the phase of the reference sample pulse DS1 is shifted backward by one step with the phases of the peak sample pulse DS2 and the AD clock signal ACK being fixed. In Step S24, repetitive processing in the period of one cycle of the reference sample pulse DS1 is set. In Step S25, the image data obtained by the imaging element 2 is fetched. In Step S26, the brightness level in the reference sample pulse detecting region of the fetched image data is detected.

In Step S27, a difference between the brightness level calculated from the image data fetched at the phase of the reference sample pulse DS1 one step earlier and the brightness level calculated from the image data detected at the current phase is calculated, and it is judged whether or not the calculated difference is at most a predetermined threshold value. When the difference is judged to be at most the threshold value in the Step S27, the current phase is judged to be in the stable region (Step S28).

In Step S29, the phase of the reference sample pulse DS1 is shifted backward by one step with the phases of the peak sample pulse DS2 and the AD clock signal ACK being fixed. After the shift of the phase by one step, the process returns to Step S25 and the Steps S25-S29 are implemented again so that it is judged if the shifted phase is in the stable region. This operation is repeatedly executed over the period of one cycle so as to judge what phases are included in the stable region.

Finally, in Step S30, a central value of the phases judged to be included in the stable region is decided as the optimum value of the phase of the reference sample pulse DS1. In the final judgment of a stable region, in the case where there are the phases judged to be included in the stable region in at least two discontinuous intervals, the shorter interval may be ignored, or the interval where the phase judged to be included in the stable region continues in a longest duration may be judged to be the stable region.

In the case where a noise component is large, the stable region may be wrongly detected or may not be detected at all based on the different between two pixels. In that case, a filter calculator, for example, or the like, may be used so that a difference between an average value of the brightness levels in at least three phases and an average value of the brightness levels in the current phase is calculated and compared to a threshold value. Alternatively, dispersion of brightness levels in at least three phases may be calculated and compare to a threshold value.

The initial values of the phase of the reference sample pulse DS1 used in the phase adjustment flow of the reference sample pulse DS1 and in the phase adjustment flow of the peak sample pulse DS2 may be the same or different to each other. For example, the initial value of the phase of the reference sample pulse DS1 in the phase adjustment flow of the peak sample pulse DS2 may be set to be in the vicinity of the reference period T2 predicted from the design specifications. The initial value of the phase of the reference sample pulse DS1 for fetching the first image data in the phase adjustment flow of the reference sample pulse DS1 may be set to be within the reset period T1 in order to detect any sudden reduction of the brightness signal.

Phase Adjustment of the AD Clock Signal ACK

Figure 12B:
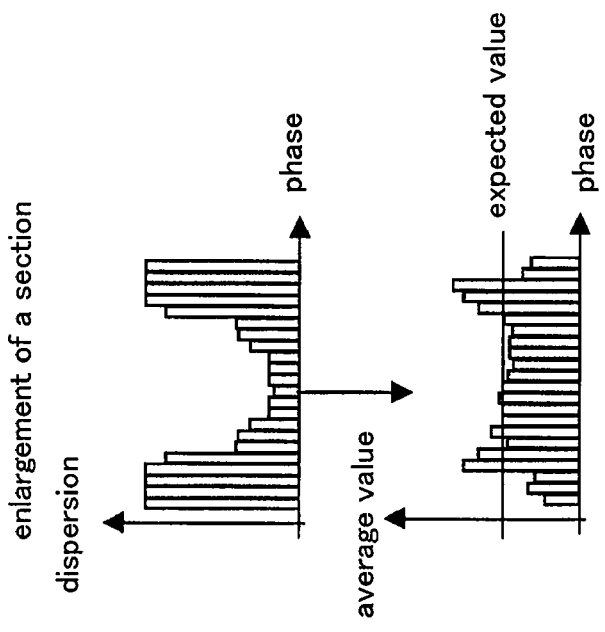
FIG. 12B is a graph showing average values of a brightness level of the signal component used in the phase adjustment of the AD clock signal according to the preferred embodiment 1.
Figure 12A:
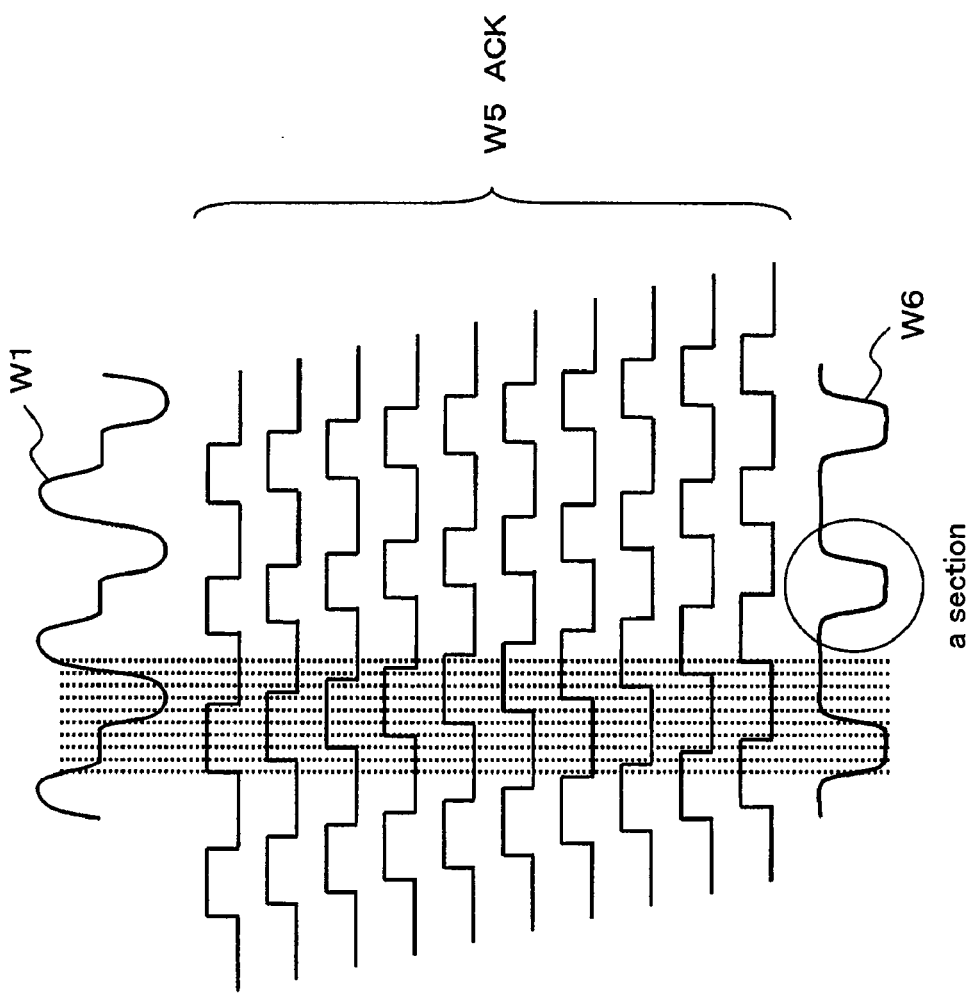
FIG. 12A is a timing chart of a signal component used in the phase adjustment of an AD clock signal according to the preferred embodiment 1.
Figure 13:
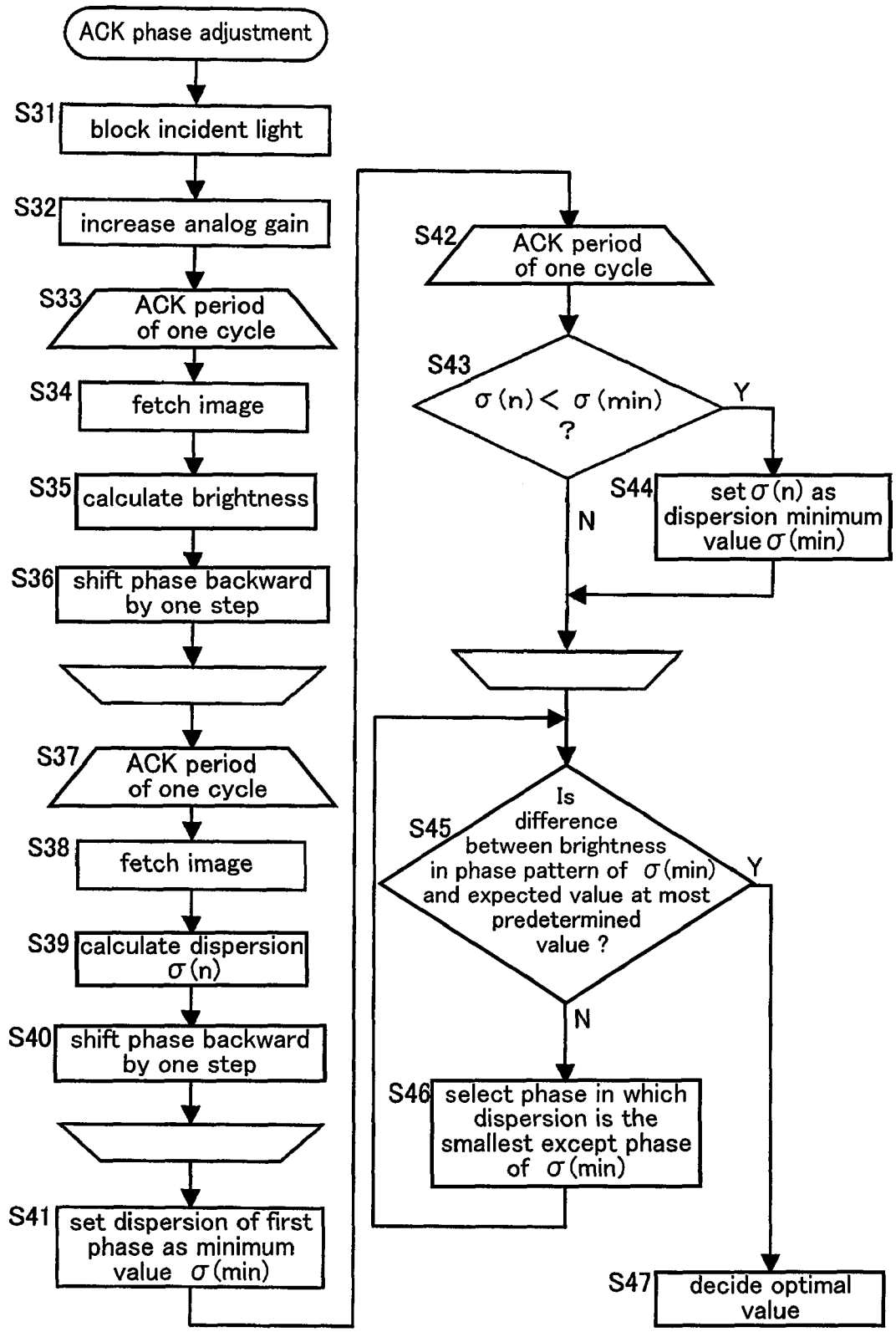
FIG. 13 is a flow chart illustrating detailed operations of the phase adjustment of the AD clock signal according to the preferred embodiment 1.

Next, the phase adjustment of the AD clock signal ACK is described referring to FIGS. 12A, 12B and 13. FIG. 12A is a timing chart of the signal component used in the phase adjustment of the AD clock signal ACK. FIG. 12B shows the dispersal transition in the phase adjustment of the AD clock signal ACK. FIG. 13 is a flow chart showing details of the phase adjustment of the AD clock signal ACK. The flow chart shown in FIG. 13 corresponds to the Steps S5 and S6 shown in FIG. 7.

In FIGS. 12A, W1 denotes an imaging element output signal, and W6 denotes the dispersion. The dispersion in this example is defined as the dispersion of the signal levels of the respective pixels in apart or all of at least one of the effective pixel region and the OB pixel region (which is a second pixel region, and hereinafter referred to as an AD clock signal detecting region) in a state where light is blocked with respect to the imaging element 2. More specifically, the dispersion denotes a value which shows a degree of the dispersion of the signal levels of the respective pixels which are supposed to be constant in an ideal situation because the imaging element 2 is in the light-blocking state. Therefore, it is necessary to set the phase of the AD clock signal ACK so that the dispersion is reduced. The pixel region for which the dispersion is calculated and the pixel region for which the brightness level is detected may be the same or different to each other.

When the imaging element output signal W1 is in the state shown in FIG. 12A, the phases of the reference sample pulse DS1 and the peak sample pulse DS2 are fixed to the optimum values, and the phase of the AD clock signal ACK is then shifted from the initial value as shown in W5, recessed shapes as shown in W6 are generated in the dispersion. The phase of the AD clock signal ACK should be decided so that the value of the dispersion W6 is minimized; however, the dispersion W6 may show the minimum value at a wrong position due to some factor. Based on that, the brightness level of the AD clock signal detecting region is compared to a predetermined expected value (previously set) in the phase where the dispersion W6 is judged to be minimum. Because the OB pixel region is light-blocked, there is an expected value as the DC offset in the design specifications. When the brightness level of the AD clock signal detecting region is very different to the expected value, it is not possible to say that the AD clock signal ACK is optimized. Therefore, only when it is judged that the difference between the brightness level and the expected value is at most a threshold value (previously set) in the phase where the dispersion W6 is judged to be minimum, that phase is decided as the optimum value of the AD clock signal ACK. When the difference is larger than the threshold value, the difference and the threshold value are compared to each other in the phase where the dispersion W6 shows the second smallest value. The judgment described above is repeated so that the optimum value of the phase of the AD clock signal ACK is decided.

A possible method of blocking light with respect to the imaging element 2 is to close a mechanical shutter to thereby block an incident light. However, it may not be necessary to close the mechanical shutter in the case where the OB pixel region is used as the AD clock signal detecting region because it is already in the light-blocking state.

Referring to FIG. 13 is given a further detailed description. In Step S31, the incident light is blocked when the mechanical shutter is closed. This step is unnecessary in the case where the OB pixel region is used as the AD clock signal detecting region. In Step S32, an analog gain is increased to amplify only the noise component. In Step S33, the phases of the reference sample pulse DS1 and the peak sample pulse DS2 are set to the predetermined optimum values, and the phase of the AD clock signal ACK is set to the initial value. In Step S34, the image data obtained by the imaging element 2 is fetched. In Step S35, the brightness level in the AD clock signal detecting region of the fetched image data is detected, in other words, an average value of the brightness levels of the signals in the respective pixels in the AD clock signal detecting region is calculated. The processing of the Step S35 is executed in the brightness level detector 14. In Step S36, the phase of the AD clock signal ACK is shifted backward by one step in the state where the phases of the reference sample pulse DS1 and the peak sample pulse DS2 are fixed. After the shift of the phase by one step, the process returns to Step S34 and the Steps S34-S36 are executed again. The Steps S34-S36 are repeated over the period of one cycle, and the brightness level of each phase is thereby detected. The calculated brightness level is temporarily stored in a memory.

In Step S37, the phases of the reference sample pulse DS1 and the peak sample pulse DS2 are set to the optimum values decided by the foregoing method, and then, the phase of the AD clock signal ACK is set to the initial value. In Step S38, the image data obtained by the imaging element 2 is fetched again. In Step S39, dispersion σ (n) in the AD clock signal detecting region of the fetched image data is calculated, in other words, the dispersion of the signal levels of the respective pixels in the AD clock signal detecting region is calculated. n is an arbitrary positive number and denotes the number of settable phases in the period of one cycle. In other words, the dispersion of the signal levels of the respective pixels in the AD clock signal detecting region is calculated. The processing of the Step S39 is executed in the dispersion calculator 12. In Step S40, the phase of the AD clock signal ACK is shifted backward by one step in the state where the phases of the reference sample pulse DS1 and the peak sample pulse DS2 are fixed. After the shift of the phase of the AD clock signal ACK by one step, the process returns to Step S38 and the Steps S38-S40 are executed again. When the foregoing operation is repeated over the period of one cycle, the dispersion for each phase is calculated. The calculated dispersion is temporarily stored in the memory. In the description, the distribution of the brightness level and the distribution of the dispersion are separately calculated at different times when the image data is fetched; however, they can be calculated at the same time in one fetch of the image data.

Thus processed, the distributions of the brightness level and the dispersion for each phase are stored in the memory. Then, the data stored in the memory is used to calculate the optimum phase of the AD clock signal ACK. Below is given a detailed description. In Step S41, the dispersion $\sigma(1)$ of the first phase is set as a minimum value $\sigma$ (min). In Step S43, the dispersion of the second phase and phases thereafter is set as $\sigma(n)$, and each dispersion $\sigma(n)$ is compared to the dispersion $\sigma$ (min). When the $\sigma(n)$ is smaller in the comparison, $\sigma(n)$ is set as a new minimum value $\sigma$ (min) in Step S44. The Steps S43-S44 are repeated until the last phase is done so that the phase where the dispersion is minimized can be calculated.

In Step S45, it is judged whether or not a difference between the brightness level of the phase where the dispersion is minimized and an expected value determined by the design specifications is at most a threshold value (predetermined). When the brightness level in the phase where the dispersion is minimized is larger than the threshold value in the judgment of the Step S45, the processing of Step S46 is executed to the phase whose dispersion is the smallest except the phase of a (min). Then, the Steps S45 and S46 are repeated until the optimum phase is decided. When the brightness level in the phase where the dispersion is minimized falls within the threshold value after the Steps S45 and S46 are repeated, the phase obtained then is decided as the optimum phase of the AD clock signal ACK in Step S47.

Phase Adjustment of Horizontal Transfer Pulses H1 and H2

Figure 15:
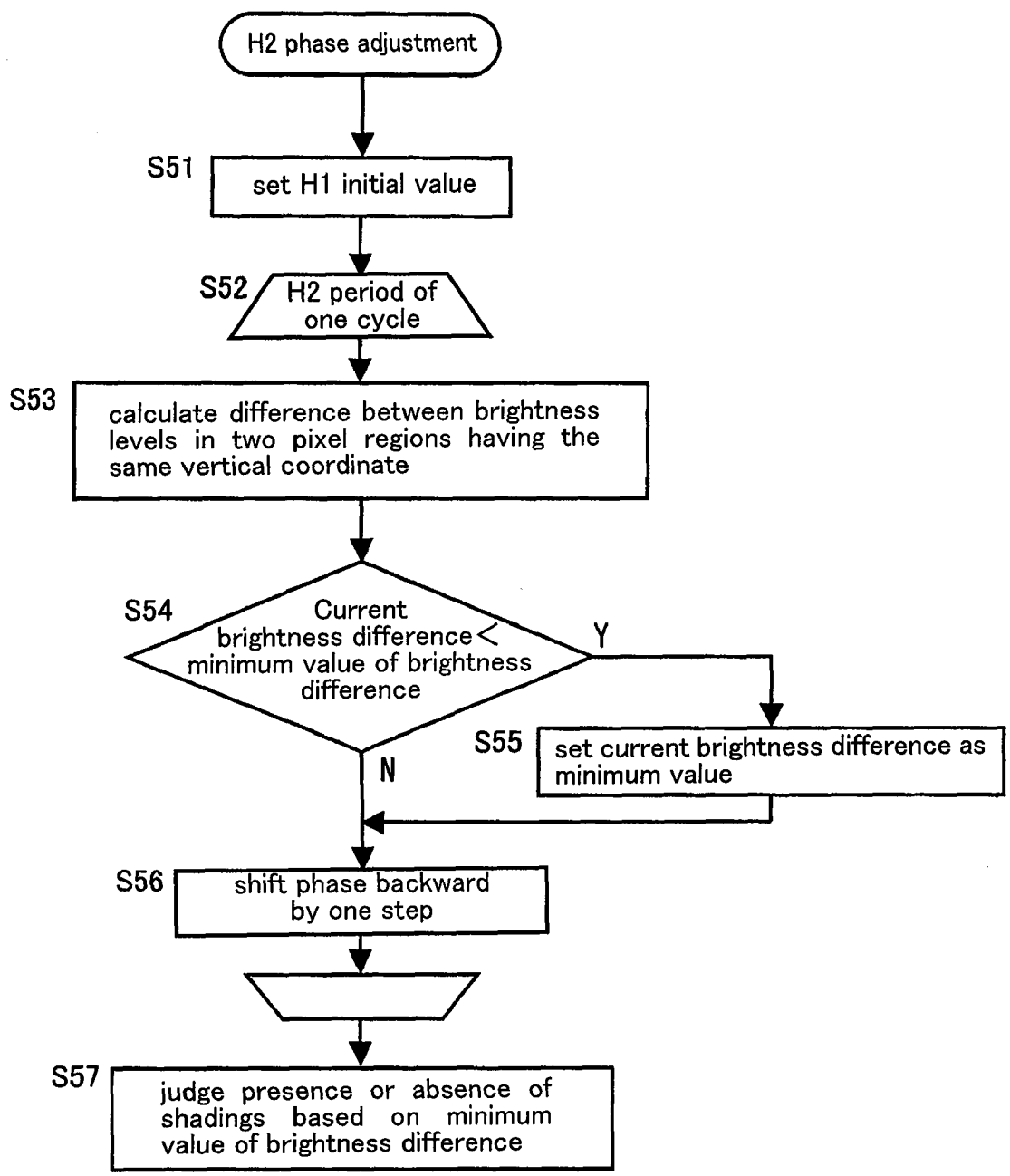
FIG. 15 is a flow chart illustrating detailed operations of the phase adjustment of the horizontal transfer pulse according to the preferred embodiment 1.

Referring to FIGS. 14 and 15, the phase adjustments of the horizontal transfer pulses H1 and H2 are described. FIG. 14 is a timing chart of the signal component used when the phases of the horizontal transfer pulses H1 and H2 are adjusted. FIG. 15 is a flow chart illustrating details of the phase adjustments of the horizontal transfer pulses H1 and H2. The flow chart shown in FIG. 15 corresponds to the Steps S7 and S8 shown in FIG. 7.

In FIG. 14, H1 denotes a first horizontal transfer pulse, and W6 denotes a second horizontal transfer pulse. When the phases of the horizontal transfer pulses H1 and H2 are adjusted, the second horizontal transfer pulse H2 is shifted as shown in W6 in a state where the phase of the first horizontal transfer pulse H1 is fixed to an initial value. The horizontal transfer pulse to be fixed is not necessarily limited to the first horizontal transfer pulse H1. The first horizontal transfer pulse H1 may be shifted in a state where the phase of the second horizontal transfer pulse H2 is fixed to an initial value. Below is given a detailed description.

In Step S51, the phase of first horizontal transfer pulse H1 is fixed to the predetermined initial value. Then, in Step S52, the processing to be repeated over the period of one cycle of the second horizontal transfer pulse H2 is set. In Step S53, a difference between the brightness levels in two pixel regions having the same vertical coordinate is calculated. In Step S54, the calculated brightness difference is compared to a minimum value of the brightness level so far obtained. When the calculated brightness difference is smaller than the minimum value as a result of the comparison in the Step S54, the calculated brightness difference is set to the minimum value so far obtained in Step S55. When the minimum value of the current brightness difference up to then is smaller than the calculated brightness difference in the comparison result, the brightness minimum value is not updated.

In Step S56, the phase of the second horizontal transfer pulse H2 is shifted backward by one step in the state where the phase of the first horizontal transfer pulse H1 is fixed. More specifically, the timing adjuster 14 sends an instruction to the timing generator 6 that such a shift of the phase is generated. After the phase of the second horizontal transfer pulse H2 is shifted by one step, the process returns to Step S53 and the Steps S53-S56 are implemented again, wherein the minimum value of the brightness difference so far obtained and the current brightness difference are compared to each other. This processing is repeated in the period of one cycle. Then, in Step S57, the presence or absence of the shadings is judged based on the minimum value of the brightness difference. When the judgment shows the absence of the shadings in the Step S57, the phase at the time is decided as the optimal phase of the second horizontal transfer pulse H2.

Figure 16:
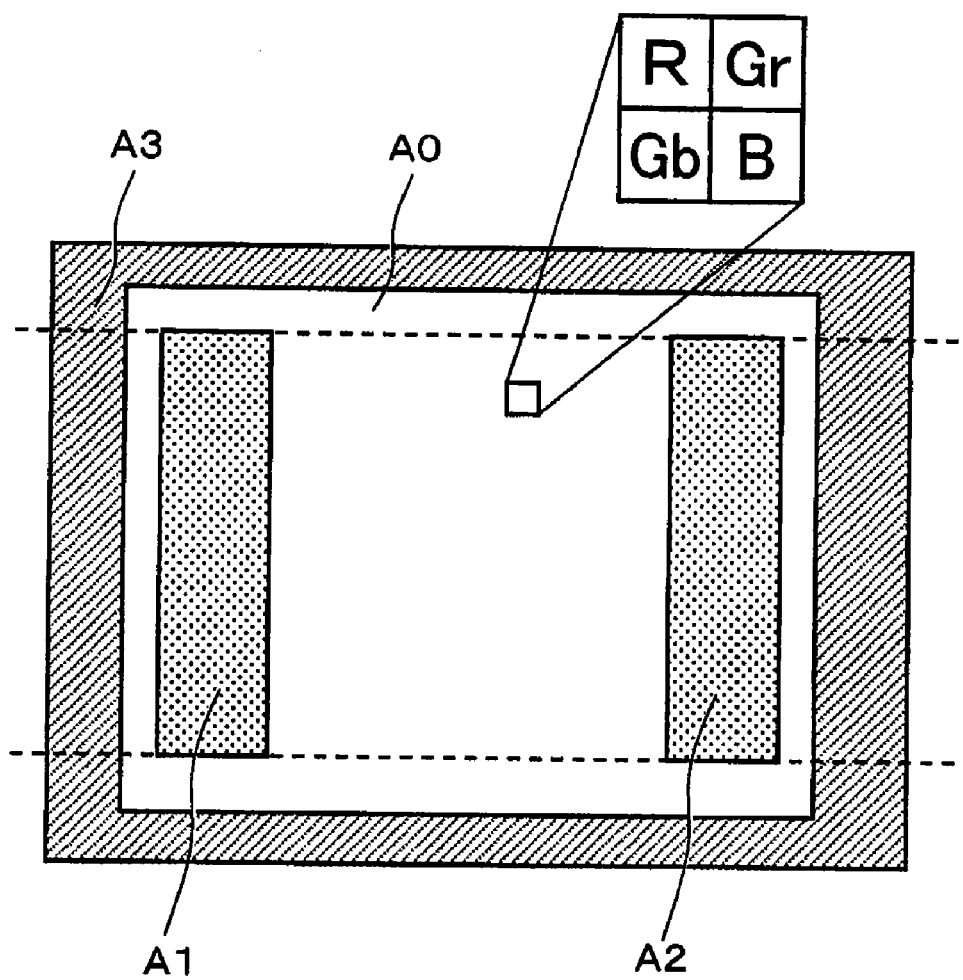
FIG. 16 shows the detection of color shadings due to the deterioration of the horizontal transfer according to the preferred embodiment 1.

In the case where the imaging element 2 is CCD comprising a primary color filter of the Bayer array including R (red), G (green) and B (blue) as shown in FIG. 16, for example, the brightness levels in two pixel regions (horizontal transfer pulse detecting regions A1 and A2) having the same vertical coordinate in an effective pixel region A0 are calculated in relation to R, Gr, Gb and B. A3 is an OB pixel region. The brightness level is defined as an average value of the brightness levels of the signals in the horizontal transfer pulse detecting regions A1 and A2 as described earlier. In the case where the transfer residue is added to the next pixel due to the deterioration of the transfer, the balance of colors is different on the right and left sides of the screen, which results in the generation of color shadings. Therefore, the difference between the brightness levels in the two regions in which the colors are calculated is obtained, and it is judged that the color shadings are not generated on the right and left sides of the screen when there is not any difference in the brightness levels. In other words, when the phase in which the sum of the differences of the respective colors is minimized is detected, the optimal phase of the second horizontal transfer pulse H2 is decided. However, because the judgment is based on the detection of a change in color balance due to the deterioration of the transfer efficiency, the object subjected to the judgment (photographic subject) has to emit light of an arbitrary single chromatic color. In the case of a photographic subject which emits light of an achromatic color such as black or white, wherein signal output of the respective colors are constant, the addition of the transfer residue from the previous pixel and the deduction due to the transfer deterioration are offset. As a result, even if there is a deterioration in transfer efficiency, it is not possible to observe any difference in the signals before and after the transfer.

The brightness level detector 11 according to the present preferred embodiment comprises two sampling regions for calculating the brightness level. Therefore, when the brightness level is calculated independently for each color, the phase of the horizontal transfer efficiency can be adjusted.

According to the method described so far, the phases of the reference sample pulse DS1, peak sample pulse DS2, AD clock signal ACK and horizontal transfer pulses H1 and H2 can be automatically adjusted. Therefore, the phase of the pulse outputted from the timing generator 6 can be automatically adjusted even in the case where the system into which the phase adjustment device is incorporated is changed, the imaging element 2 itself is exchanged, or the characteristic of the imaging element 2 is changed due to any external factor (temperature, deterioration over time, and the like). Furthermore, because the phases of the pulses are adjusted according to the different individual methods under the optimal conditions in terms of the image quality and in consideration of the characteristic of each pulse, a high accuracy in the automatic adjustment can be achieved.

The brightness level detector 11, dispersion calculator 12, shading detector 13 and timing adjuster 14, which are the components, can be realized as hardware circuits, or can be realized as software processing by a microcomputer. The flow of the adjustment is not limited to the steps shown in FIG. 7, and may be changed. The present preferred embodiment is merely an example, and it is needless to say that there are various possible modified embodiments other than major modified embodiments described below.

Preferred Embodiment 2

In the phase adjustments of the reference sample pulse DS1 and the peak sample pulse DS2, it is difficult to adjust the phases unless the brightness level of at least a certain level is obtained because the optimal phases are judged from the brightness level. Many of digital camera systems for medical care are provided with an auxiliary light emission device such as LED (light emitting diode). Therefore, in the case where the phase is adjusted once, and the brightness level as a peak level is at most a predetermined value in the system in which the auxiliary light can be used, the phase adjustment may be implemented again in a state where the auxiliary light is irradiated on the photographic subject by the auxiliary light emission device.

In the case of being provided with such a photographic subject that any arbitrary color out of the respective colors (RGB) which are set as the filter colors in the color filter of the imaging element 2 (CCD) can be singly irradiated or reflected thereon, attention is paid to a pixel corresponding to the color entering the imaging element 2 from the photographic subject, and average of brightness levels of a group of pixels which adjoin in the pixel horizontally are calculated. As a result, the deterioration of the transfer efficiency can be detected. In the case where the read (R) singly enters the imaging element 2 from the photographic subject, the output signal of green (gr) is ideally 0 unless the transfer efficiency is deteriorated. Then, only the brightness level of green (gr) in a partial region or an entire region of the effective pixel region is calculated while the phase of the second horizontal transfer pulse is gradually being shifted, and the phase in which the obtained value is minimized is detected as the phase in which the transfer residue (leak) due to the transfer deterioration is minimized. The detected phase in which the transfer residue (leak) is at minimum is decided as the optimal phase of the second horizontal transfer pulse H2. In the present preferred embodiment, the brightness level is calculated independently for each color in the brightness level detector 11, and the phase of the horizontal transfer pulse can be adjusted.

Preferred Embodiment 3

In the preferred embodiments 1 and 2 so far were described the two phase adjustments, which were the phase adjustment of the horizontal transfer pulse (the phase adjustment of the pulse for controlling the horizontal transfer of the imaging element 2) and the phase adjustment of the sample pulse (the phase adjustments of the reference sample pulse DS1 which is the pulse for sampling the signal outputted from the imaging element 2 in the correlated double sampling unit 4, peak sample pulse DS2 and AD clock signal ACK).

Figure 17:
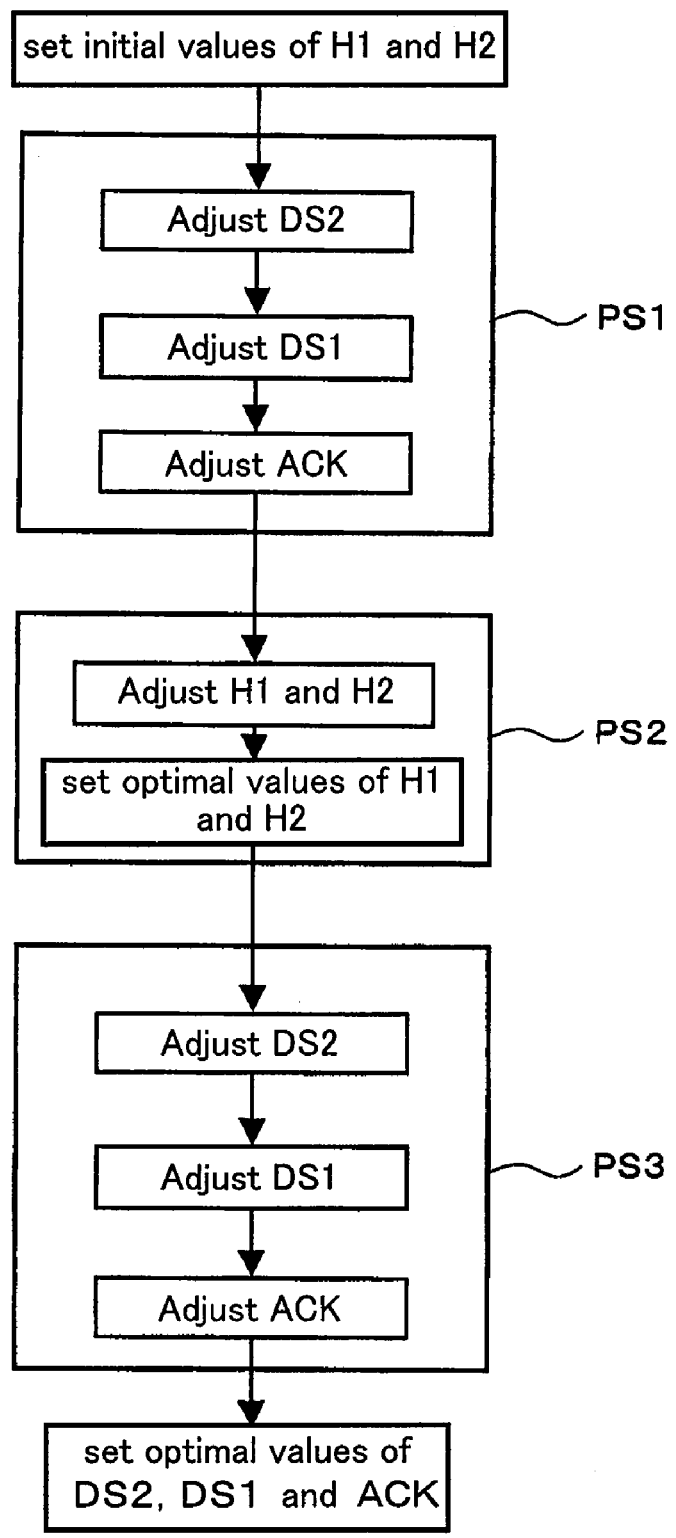
FIG. 17 is a flow chart illustrating overall operations of a phase adjustment method according to a preferred embodiment 3 of the present invention.

However, in the phase adjustment of the sample pulse, the correlation of the reference sample pulse DS1, peak sample pulse DS2 and AD clock signal ACK with respect to arbitrary phases of the horizontal transfer pulses H1 and H2 in a certain mounting state is adjusted. Therefore, when the phase of the horizontal transfer pulse is changed, the optimal phases of the reference sample pulse DS1, peak sample pulse DS2 and AD clock signal ACK are also changed. Further, in the phase adjustment of the horizontal transfer pulse, it is not possible to accurately sample the signal in the correlated double sampling unit 4 unless the phases of the reference sample pulse DS1, peak sample pulse DS2 and AD clock signal ACK are appropriate, which renders the measured data unreliable. Therefore, the foregoing two phase adjustments are repeated as shown in FIG. 17 so that the accuracy can be improved. A preferred embodiment 3 of the present invention results from the improvement of the preferred embodiments 1 and 2 made in the consideration of the aspect.

Below is described the operation according to the preferred embodiment 3.

Sample Pulse Adjustment PS1

First, the horizontal transfer pulses H1 and H2 are set to the initial values, and then, the phases of the reference sample pulse DS1, peak sample pulse DS2 and AD clock signal ACK are adjusted. As a result, the sampling timing in the correlated double sampling unit 4 can be optimized.

Horizontal Transfer Pulse Adjustment PS2

Next, the phases of the horizontal transfer pulses H1 and H2 are adjusted in a state where the correlation of the reference sample pulse DS1, peak sample pulse DS2 and AD clock signal ACK with respect to the horizontal transfer pulses H1 and H2 are optimally adjusted, so that the transfer efficiency of the imaging element 2 is optimized.

Sample Pulse Adjustment PS3

Thereafter, the phases of the reference sample pulse DS1, peak sample pulse DS2 and AD clock signal ACK are adjusted again, and the correlation of the reference sample pulse DS1, peak sample pulse DS2 and AD clock signal ACK with respect to the horizontal transfer pulses H1 and H2 is adjusted in such a manner as suitable for the optimized horizontal transfer pulses H1 and H2.

The optimal phases of the horizontal transfer pulses H1 and H2, reference sample pulse DS1, peak sample pulse DS2 and AD clock signal ACK, which were decided as a result of the two phase adjustments repeatedly implemented, are set in the register in the timing generator 6. As a result, the respective pulses having the optimum phases can be generated.

Preferred Embodiment 4

Figure 18:
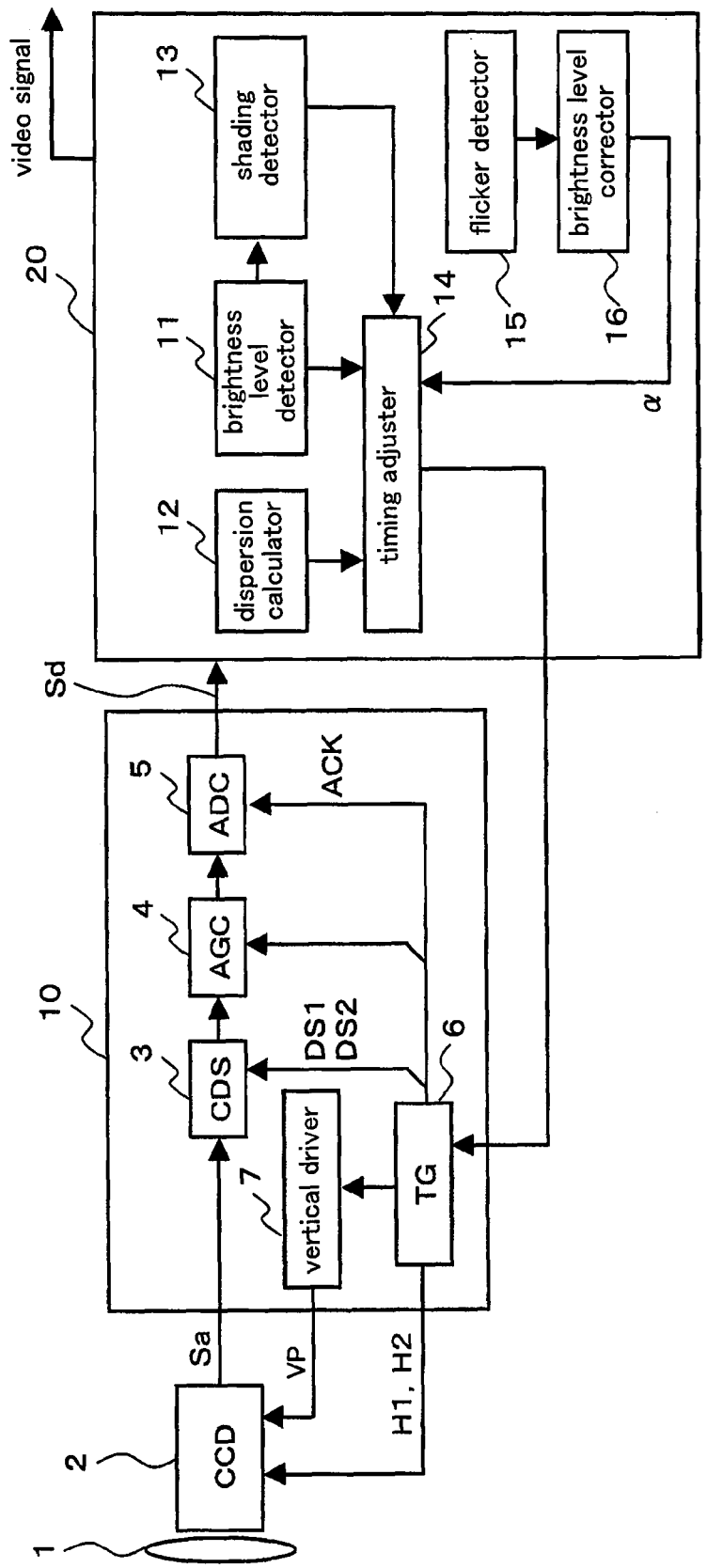
FIG. 18 is a block diagram illustrating an entire constitution of a digital camera according to a preferred embodiment 4 of the present invention.

FIG. 18 is a block diagram illustrating an entire constitution of a digital camera according to a preferred embodiment 4 of the present invention. In the present preferred embodiment, the sampled brightness level is corrected in accordance with a cycle of a flicker generated when an image is obtained under a fluorescent light. In FIG. 18, the same reference symbols as those shown in FIG. 1 according to the preferred embodiment 1 show the same components. In the present preferred embodiment, a flicker detector 15 and a brightness level corrector 16 are further provided in the constitutions according to the preferred embodiments described so far.

Figure 19:
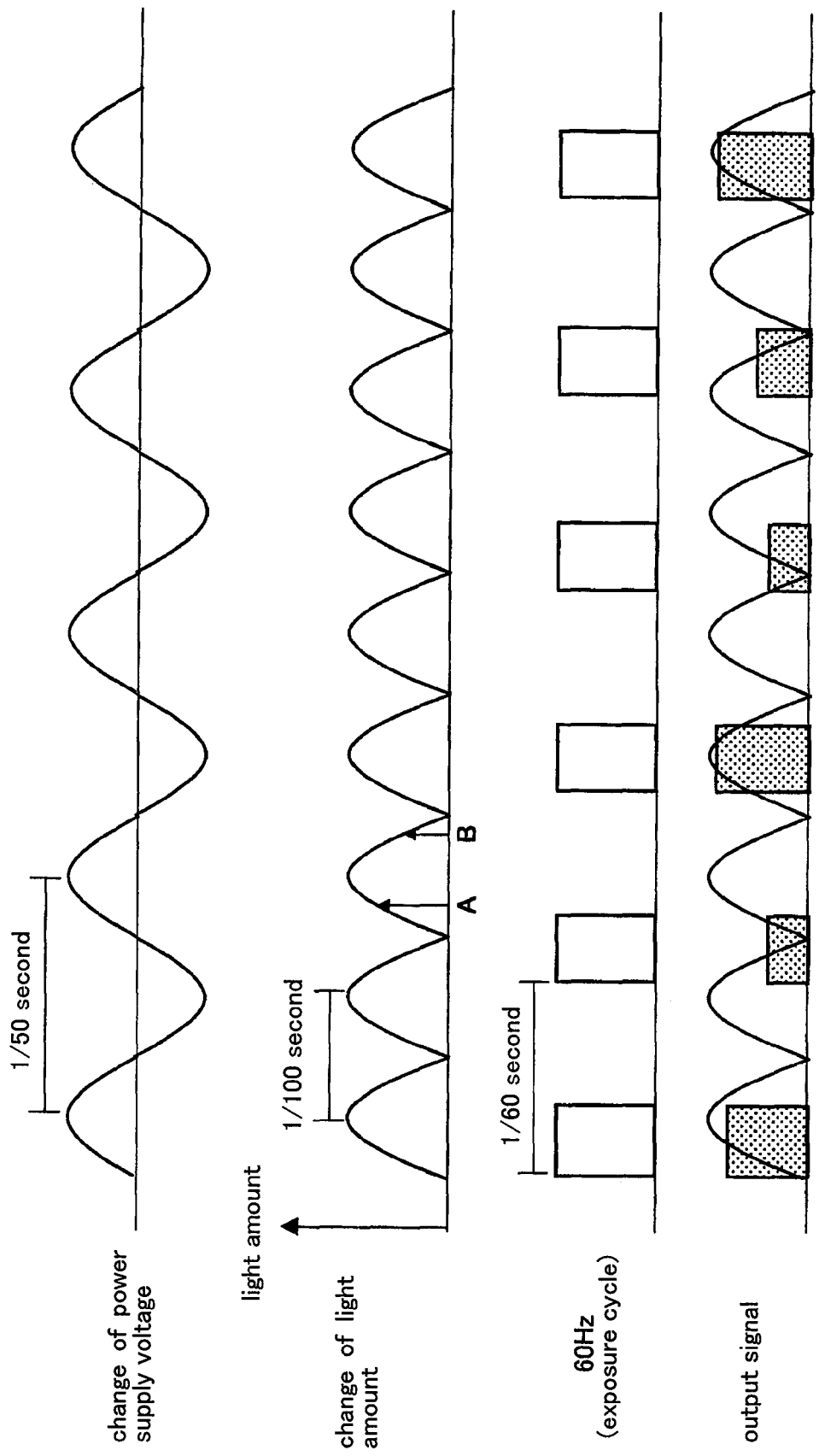
FIG. 19 shows the principle of a flicker generated by a fluorescent light according to the preferred embodiment 4.

Below is described how the flicker is generated. A light amount of the fluorescent light changes in the ½ cycle of a power supply cycle under the influence of a frequency of a power supply voltage. For example, the cycle of the change of the fluorescent light amount at the time when the power supply voltage of 50 Hz is used is $\frac{1}{100}$ second as shown in FIG. 19. Therefore, when the same photographic subject is imaged at the same shutter speed at timings shown by A and B in the drawing, the light amount varies between at the timings A and B, and an image signal thereby obtained is darker at B than at A, which difference in darkness is the flicker.

The reading operation follows the plane sequential order in the imaging element 2 (CCD). Therefore, the flicker is generated between frames under the influence of the change in light amount of fluorescent light in the case where the cycle of the light amount of the fluorescent light and an exposure cycle of one frame are not related to each other in the manner of a positive integral multiple (for example, in the case where the frequency of one frame is 60 Hz under the fluorescent light of the 50 Hz power supply as shown in FIG. 19).

When the fluorescent light is thus used as a light source during phase adjustment, the light amount changes every time when the data is measured due to the influence of the flicker. The change of the light amount due to the flicker affects the brightness level calculated by the brightness level detector 11, and the optimal phase thereby cannot be accurately judged.

In order to correct the flicker, in general, an analog gain multiplication method may be adopted in the automatic gain controller 4 in accordance with the frequency of the generated flicker, or the shutter speed maybe changed on a frame-by-frame basis. When either of these correcting method is adopted in the phase adjustment, the data measurement conditions vary from phase to phase, which is not preferable.

In the preferred embodiment 4, the flicker, if generated, is detected by the flicker detector 15, and such a correction coefficient a that the change of the light amount is cancelled so that the output level can be constant is calculated by the brightness level corrector 16. Then, the brightness level outputted from the brightness level detector 11 is multiplied by the calculated correction coefficient a calculated in accordance with the cycle of the flicker. As a result, the flicker can be corrected under the same data measurement conditions, which realizes the calculation of the brightness level which is accurate.

Preferred Embodiment 5

Figure 20:
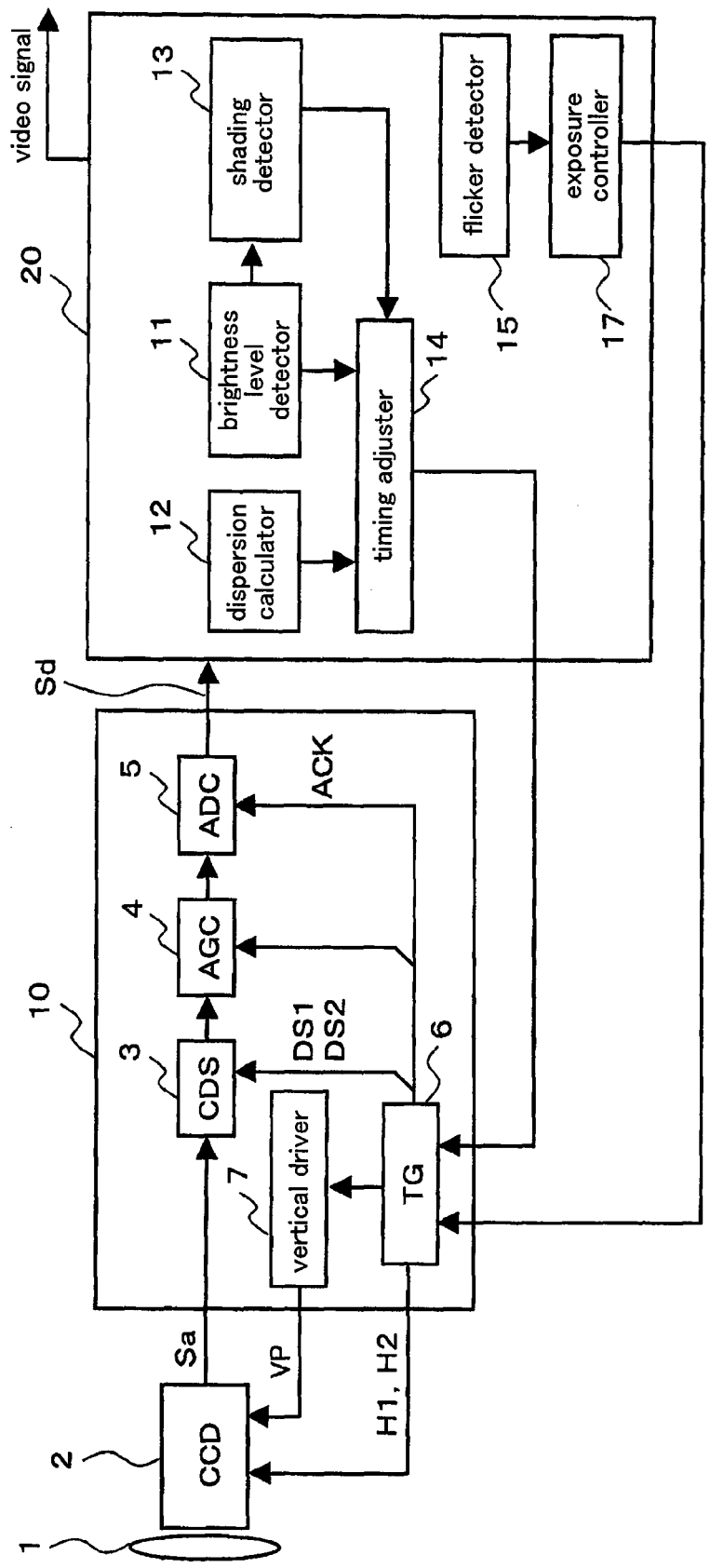
FIG. 20 is a block diagram illustrating an entire constitution of a digital camera according to a preferred embodiment 5 of the present invention.

FIG. 20 is a block diagram illustrating an entire constitution of a digital camera according to a preferred embodiment 5 of the present invention. The present preferred embodiment is another example for controlling the flicker. In FIG. 20, the same reference symbols as those shown in FIG. 18 according to the preferred embodiment 4 show the same components. In the present preferred embodiment, the shutter speed is fixed to a predetermined period of time in an exposure controller 17 so that the flicker is corrected.

Figure 21:
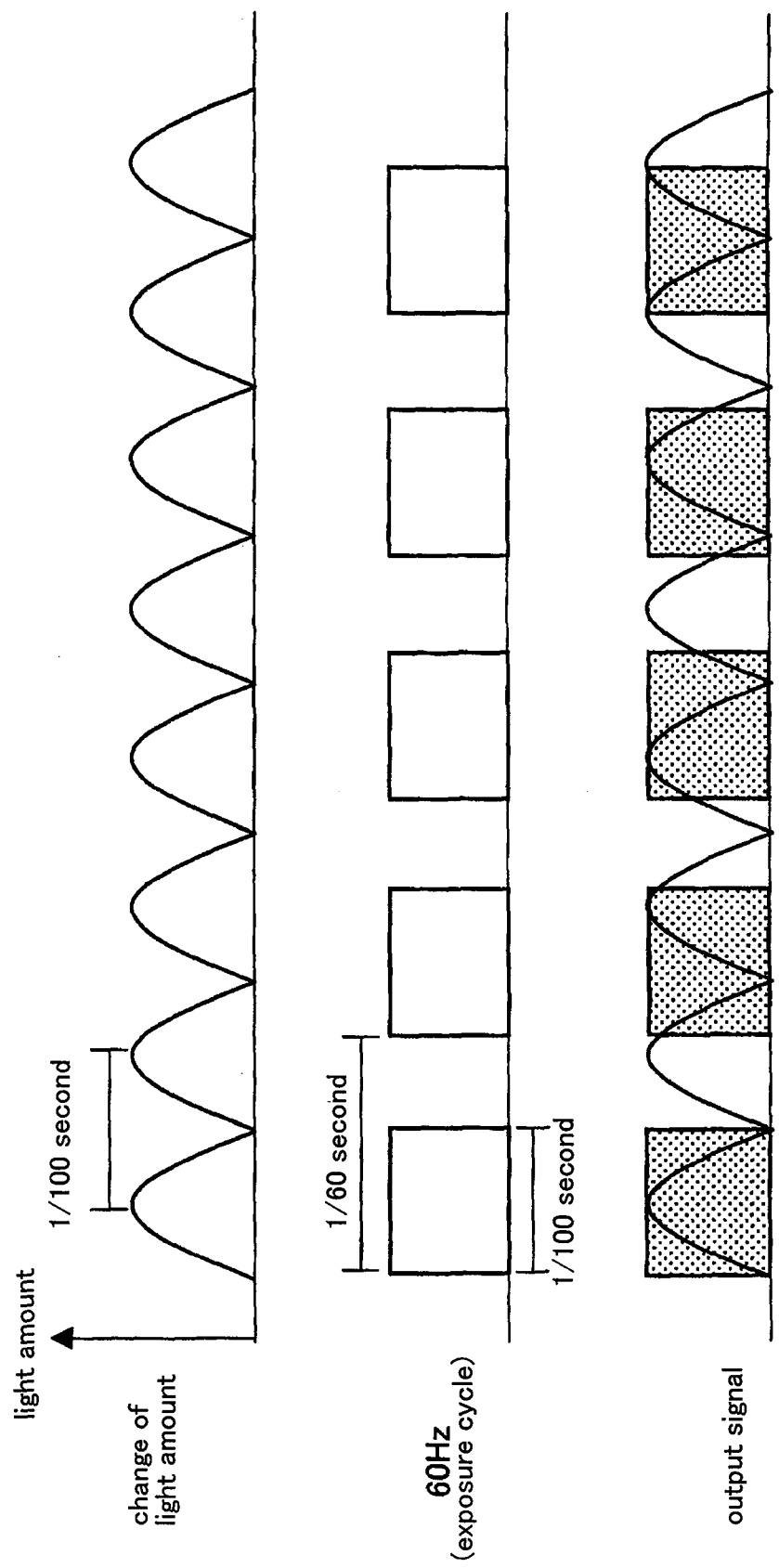
FIG. 21 shows the control of the flicker by controlling an exposure cycle according to the preferred embodiment 5.

FIG. 21 is an illustration of the flicker control according to the present preferred embodiment wherein the shutter speed is fixed to $\frac{1}{100}$ second under the fluorescent light having the power supply voltage of 50 Hz. When the shutter speed is set to $\frac{1}{100}$ second, the exposure time of the imaging element 2 and the cycle of the light amount change of the fluorescent light are consistent with each other. Therefore, the output signal level is no longer variable, and the generation of the flicker is consequently controlled. In this case, the shutter speed at which the flicker is not generated in the output signal level is an integral multiple of the cycle of the light amount change of the fluorescent light.

When the flicker is detected by the flicker detector 15, the exposure controller 17 sets the shutter speed to an integral multiple of the cycle of the light amount change of the fluorescent light, and the register in the timing generator 6 is set so that the pulse corresponding to the set shutter speed is generated. Accordingly, the shutter speed is fixed to the integral multiple of the cycle of the light amount change based on the pulse outputted from the timing generator 6. Therefore, the output signal at a constant level can be obtained, and the brightness level can be thereby accurately measured.

In a digital camera, generally, the flicker detector 15 and the exposure controller 17*t* are already provided so that AE (automatic exposure) is realized. Therefore, in the present embodiment, it is unnecessary to add any new circuit element because those circuit elements can be utilized.

There are the following possible modified embodiments in the preferred embodiments.

Modified Embodiment 1

Figure 22:
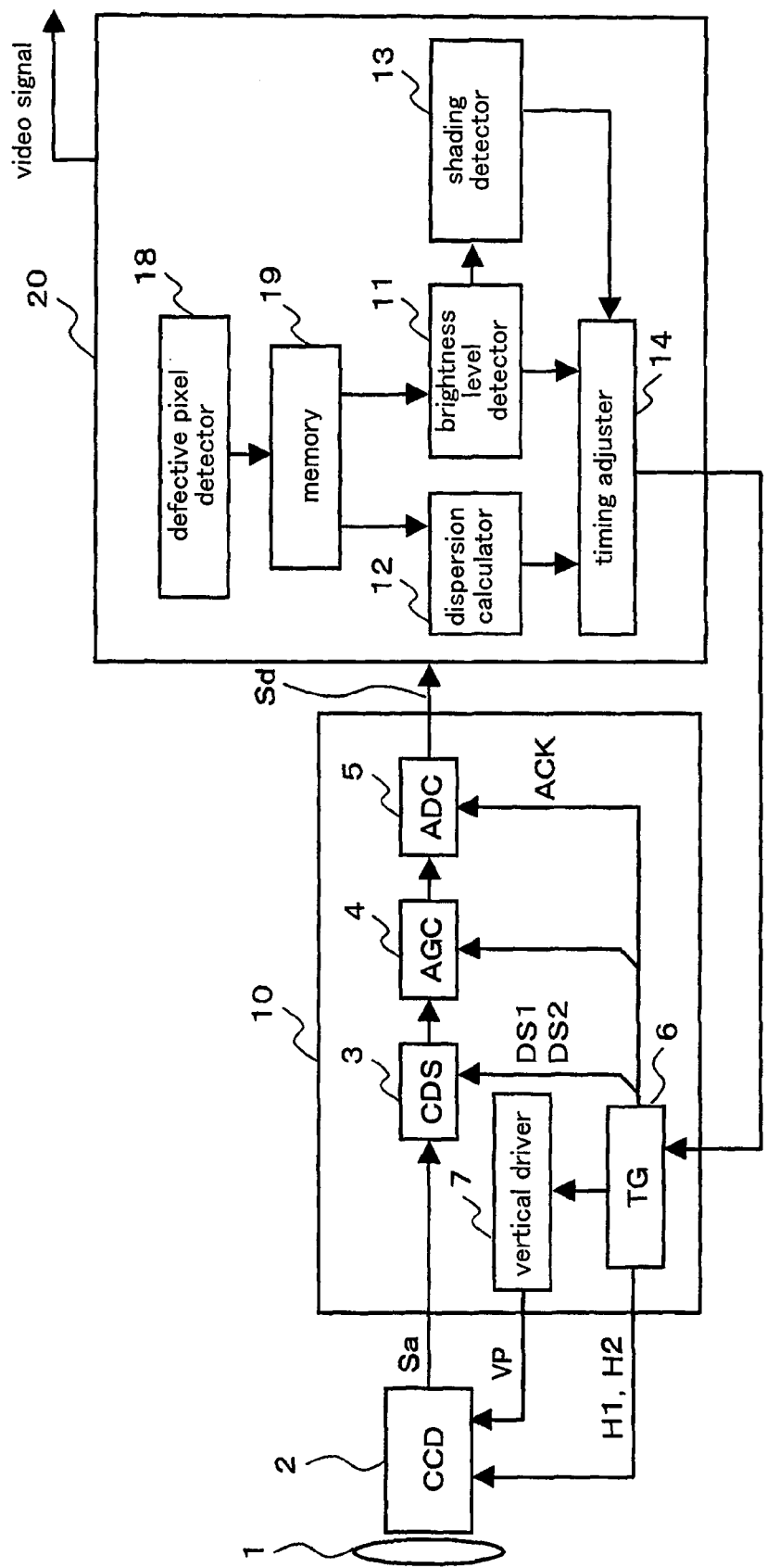
FIG. 22 is a block diagram illustrating an entire constitution of a digital camera according to a modified embodiment 1 of the preferred embodiments.

FIG. 22 is a block diagram illustrating an entire constitution of a digital camera according to a modified embodiment 1 of the preferred embodiments. The present modified embodiment is based on the technical idea that any defective pixel is not used for the phase adjustment of the pulse. A defective pixel detector 18 and a memory device 19 are provided.

The group of pixels constituting the imaging element 2 may include defective pixels resulting from the manufacturing process. In the defective pixels, the signal level is often fixed to around the maximum or minimum value irrespective of the light amount of the incident light. Therefore, it is desirable not to use the value of the defective pixel for the phase adjustment even if the value is within the pulse detecting region. In the present modified embodiment, the defective pixel is detected by the detective pixel detector 18, and the address of the defective pixel is memorized in the memory device 19 in advance. Accordingly, it can be avoided to use the defective pixel for the phase adjustment, which improves the accuracy of the phase adjustment.

The defective pixel detector 18 may be variously constituted. The defective pixel detector 18 may be constituted in such a manner that the charges are stored for a certain period of time with a mechanical shutter being closed when the digital camera is activated, and the pixel in which the signal level is at least a predetermined threshold value is detected as the defective pixel. The memory device 19 is not necessarily adapted to store the addresses of all of the defective pixels, and all it has to do is to store the addresses of a predetermined number of defective pixels.

Modified Embodiment 2

Figure 23:
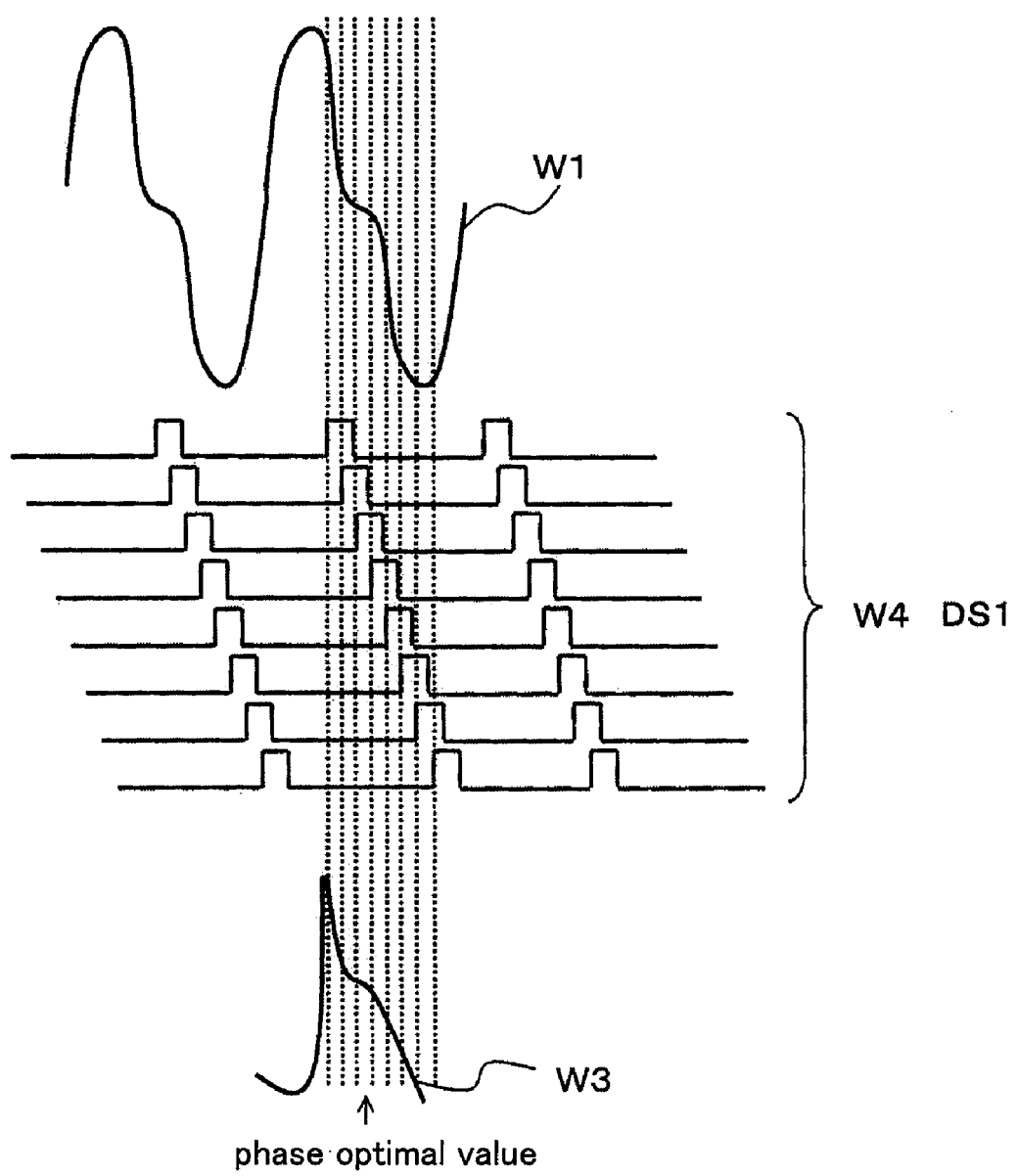
FIG. 23 chronologically shows a signal component outputted from CCD in the case where a signal quality is poor according to a modified embodiment 2 of the preferred embodiments.

When the above described reference sample pulse DS1 is set, a region where a difference between the adjacent pixels is at most a predetermined threshold value is recognized as a stable region, and the pulse adjustment is performed so that the rising edge of the reference sample pulse DS1 arrives at the center of the stable region. However, when the signal quality is low as shown in FIG. 23, the phase period corresponding to the stable region may not be detected. Even so, a region where the tilt of the signal component is relatively small may be alternatively regarded as the stable region. In the present modified embodiment, when it is not possible to detect the stable region, the threshold value is increased so that any region where the tilt of the signal component has a certain degree can be alternatively regarded as the stable region. In the case where the stable region which is alternatively detected as the stable region lasts for a certain period of time, the phase of the reference sample pulse DS1 is adjusted so that the rising edge arrives at the center of the period.

Modified Embodiment 3

The stable region may not be necessarily detected based on the calculation of the difference between the adjacent pixels, and may be detected based on a difference between first and second stable region detecting results. The stable region is detected, for example, as follows.
First Stable Region Detection
    a difference between an average value of the brightness levels in at least three phases and an average value of the brightness levels in the current phase is calculated, and
    the calculated difference is compared to a threshold value which is set to a relatively small value.
Second Stable Region Detection
    a difference between the two pixels adjacent to each other is calculated, and
    the calculated difference is compared to a threshold value which is set to a relatively large value.

The point of the present modified embodiment is characterized in that the conditions of the detection are eased in the second stable region detection so that the stable region can be more easily detected. As a result, the reference sample pulse DS1 can be set even if the signal quality is low.

Modified Embodiment 4

In the description so far, the phases of the reference sample pulse DS1, peak sample pulse DS2 and AD clock signal ACK are adjusted in such a manner that the phase is shifted over the period of one cycle. However, the degree of the phase adjustment of each pulse can be predicted in advance to some extent if the design specifications of the imaging element 2 are previously known. Based on such prediction, the adjustment range can be set to be narrower than the period of one cycle as shown in FIG. 24, and the amount of time necessary for the phase adjustment can be shortened.

Modified Embodiment 5

In the preferred embodiments described so far, the peak sample pulse DS2 is adjusted first. When the phase adjustment of the peak sample pulse DS2 is completed, the degrees of the phase adjustments of the reference sample pulse DS1 and the AD clock signal ACK can be predicted. In FIG. 25, when the phase of the peak sample pulse DS2 is decided from an imaging element output signal W1, it can be assumed that the phases of the reference sample pulse DS1 and the AD clock signal ACK should be adjusted to phases (or their neighboring phases) of which the phase difference is optimal in terms of the design specifications applicable thereafter. Then, the phases of the reference sample pulse DS1 and the AD clock signal ACK are adjusted within predetermined ranges before and after such phases.

In FIG. 25, $\Delta\theta1$ denotes a phase difference between the peak sample pulse DS2 and the reference sample pulse DS1 (optimal phase), while $\Delta\theta2$ denotes a phase difference between the peak sample pulse DS2 and the AD clock signal ACK (optimal phase). When the phases of the other pulses are predicted from the phase of the pulse which was already calculated, the adjustment range can be narrowed, and the amount of time necessary for the phase adjustment can be largely reduced.

If the accuracy is not the highest priority, it may not be necessary to adjust the phases of all of the reference sample pulse DS1, peak sample pulse DS2 and AD clock signal ACK. The phase of the pulse which is calculated first is fixed, and then the phase of the other pulses can be calculated, or the phase of the pulse calculated second is fixed, and then, the phase of the pulse to be calculated third can be decided.

Modified Embodiment 6

For example, when the phase is adjusted because the phase is shifted due to some factor such as temperature changes or deterioration over time, it is predicted that the optimal phase is in the vicinity of the last adjusted phase. Therefore, each of the phase adjustment results is memorized in the memory. Then, when the phase is adjusted again, the vicinity of the last adjusted phase may be set as the adjustment range in the phase adjustment.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A phase adjustment device for adjusting a phase of a pulse used for imaging an analog imaging signal obtained by an imaging element comprising a plurality of pixels based on a digital imaging signal resulting from the conversion of the analog imaging signal into a digital value for each pixel, comprising:
    a brightness level detector for detecting a brightness level of the digital imaging signal for each of the plurality of pixels;
    a shading detector for setting a group of effective pixel regions distant from each other in a horizontal direction in the imaging element and then checking whether or not shadings are generated in the analog imaging signal based on a difference between the brightness levels of the group of effective pixel regions; and
    a timing adjuster for adjusting a phase of a peak sample pulse for detecting a peak level of the analog imaging signal, a phase of a reference sample pulse for detecting a signal level used as a reference in the correlated double sampling executed when the digital imaging signal is generated and a phase of a horizontal transfer pulse in the imaging element based on outputs of the brightness level detector and the shading detector, wherein:
    the brightness level is an average value of the signal levels of the digital imaging signals in the effective pixel regions, and
    the shading detector detects shading based on a difference between average values of brightness levels calculated for a plurality of image signals at each of two effective pixel regions distanced from each other in a horizontal direction.

2. The phase adjustment device as claimed in claim 1, further comprising a dispersion calculator for calculating dispersion showing a signal variability between the pixels, wherein the timing adjuster further adjusts a phase of an AD clock signal used when the digital imaging signal is generated based on results obtained by the brightness level detector and the dispersion calculator.

3. A phase adjustment method for adjusting a phase of a peak sample pulse for detecting a peak level of an analog imaging signal outputted from an imaging element, a phase of a reference sample pulse for detecting a signal level which is used as a reference of the correlated double sampling executed when the analog imaging signal is converted into a digital imaging signal, a phase of an AD clock signal used when the analog imaging signal is AD-converted into the digital imaging signal, and a phase of a horizontal transfer pulse in a horizontal transfer unit of the imaging element, the horizontal transfer pulse including a first horizontal transfer pulse and a second horizontal transfer pulse, the method including:

a step of detecting the phase of the peak sample pulse in which a brightness level of the analog imaging signal is maximized in a state where the phase of the reference sample pulse and the phase of the AD clock signal are respectively fixed to arbitrary phases;

a step of setting the phase of the peak sample pulse in which the brightness level of the analog imaging signal is maximized to an optimal phase of the peak sample pulse;

a step of detecting a phase of the second horizontal transfer pulse, where a brightness level difference between two effective pixel regions distanced from each other in a horizontal direction is minimized in a state that a phase of the first horizontal transfer pulse is fixed and the phase of the second horizontal transfer pulse is shifted; and a step of setting the detected phase of the second horizontal transfer pulse as an optimal phase of the second horizontal transfer pulse.

4. The phase adjustment method as claimed in claim 3, further including:

a step of detecting a phase region in which variation of the brightness level is small in the reference sample pulse in a state where the phase of the peak sample pulse is fixed to the optimal phase of the peak sample pulse and the phase of the AD clock signal is fixed to the arbitrary phase; and a step of setting a central phase of the phase region in which the variation of the brightness level is small to an optimal phase of the reference sample pulse.

5. The phase adjustment method as claimed in claim 4, further including:

a step of detecting the phase of the AD clock signal in which dispersion showing a signal variability between the pixels is minimized in a state where the phase of the peak sample pulse is fixed to the optimal phase of the peak sample pulse, the phase of the reference sample pulse is fixed to the optimal phase of the reference sample pulse, and an incident light of the imaging element is blocked; and a step of setting the phase of the AD clock signal in which the dispersion is minimized to an optimal phase of the AD clock signal.

6. The phase adjustment method as claimed in claim 3, wherein:

the imaging element is a color filter CCD, and
brightness levels of respective colors in at least two effective pixel regions having an identical vertical coordinate are calculated while the phase of the second horizontal transfer pulse is being changed at the same time, the phase of the second horizontal transfer pulse in which variation of the calculated brightness levels of the respective colors in the at least two effective pixel regions is minimized is set to the phase of the second horizontal transfer pulse in which the horizontal transfer efficiency is maximized in the step of detecting the phase in which the horizontal transfer efficiency is maximized.

7. The phase adjustment method as claimed in claim 3, wherein the imaging element is a color filter CCD, and
the phase in which a transfer leak with respect to the horizontally adjacent pixel resulting from the deterioration of the transfer efficiency is minimized is set to the phase in which the horizontal transfer efficiency is maximized in a state where an arbitrary color of the colors which can be received by the color filter CCD is singly imaged in the step of detecting the phase in which the horizontal transfer efficiency is maximized.

8. The phase adjustment method as claimed in claim 3, further including:

a sample pulse adjusting step for adjusting at least one of the phases of the reference sample pulse, the peak sample pulse and the AD clock signal; and a horizontal transfer pulse adjusting step for adjusting at least one of the phases of the first and second horizontal transfer pulses, wherein the sample pulse adjusting step and the horizontal transfer pulse adjusting step are repeatedly executed.

9. The phase adjustment device as claimed in claim 1, further comprising a flicker detector for detecting a flicker generated in an imaging operation under a fluorescent light, wherein the timing adjuster corrects the phase to be adjusted in accordance with a cycle of the flicker which is detected by the flicker detector.

10. The phase adjustment device as claimed in claim 9, further comprising a brightness level corrector for calculating a correction coefficient in accordance with the cycle of the flicker which is detected by the flicker detector and correcting the brightness level by multiplying the brightness level calculated by the brightness level detector by the correction coefficient.

11. The phase adjustment device as claimed in claim 1, further comprising:

a flicker detector for detecting a flicker generated in an imaging operation under a fluorescent light; and an exposure controller for setting the shutter speed of the imaging element to a positive integral multiple of a cycle in which the light amount changes depending on the flicker detection by the flicker detector.

12. A digital camera comprising:

an imaging element;
a correlated double sampling unit for calculating a signal level of an analog imaging signal for each pixel obtained via the imaging element;

an automatic gain controller for adjusting an amplitude of an imaging signal outputted from the correlated double sampling unit;

an AD converter for generating a digital imaging signal by converting the imaging signal whose amplitude is adjusted by the automatic gain controller into a digital value;

the phase adjustment device as claimed in claim 1 for setting a phase suitable for the pulse used by the imaging element when the analog imaging signal is obtained based on the digital imaging signal; and a timing generator for generating the pulse based on the phase adjusted by the phase adjustment device.

13. The phase adjustment device as claimed in claim 1, wherein the shading detector detects the shading by comparing the difference and a predetermined threshold value.

* * * * *